(12) United States Patent
Breed

(10) Patent No.: US 6,419,265 B1
(45) Date of Patent: Jul. 16, 2002

(54) SELF-CONTAINED AIRBAG SYSTEM

(75) Inventor: David S. Breed, Boonton Township, Morris County, NJ (US)

(73) Assignee: Automotive Technologies International Inc., Denville, NJ (US)

(*) Notice: Subject to any disclaimer, the term of this patent is extended or adjusted under 35 U.S.C. 154(b) by 409 days.

(21) Appl. No.: 09/114,962

(22) Filed: Jul. 14, 1998

Related U.S. Application Data

(63) Continuation-in-part of application No. 08/101,017, filed on Sep. 16, 1993, now Pat. No. 5,842,716.

(51) Int. Cl.$^7$ .............................................. B60R 21/32
(52) U.S. Cl. ...................... 280/735; 280/730.2; 280/731
(58) Field of Search ................................ 280/734, 735, 280/730.2, 731

(56) References Cited

U.S. PATENT DOCUMENTS

| | | | |
|---|---|---|---|
| 3,701,903 A | * 10/1972 | Merhar | |
| 5,122,780 A | * 6/1992 | Midorikawa et al. | ....... 280/735 |
| 5,273,309 A | * 12/1993 | Lau et al. | ................. 280/730.2 |
| 5,842,716 A | * 12/1998 | Breed | ......................... 280/734 |
| 6,015,162 A | * 1/2000 | Spies et al. | .................. 280/735 |

FOREIGN PATENT DOCUMENTS

DE 4026697 * 3/1992 ................. 280/734

* cited by examiner

Primary Examiner—Eric Culbreth
(74) Attorney, Agent, or Firm—Brian Roffe

(57) ABSTRACT

A side impact airbag system for a vehicle including a system housing defining an interior space and arranged on a side of the vehicle alongside at least a portion of a passenger compartment of the vehicle. One or more airbags are arranged in the interior space of the system housing such that when inflating, the airbag(s) is/are expelled from the system housing into the passenger compartment. An inflator is arranged at least partially within the interior space of the system housing for inflating the airbag(s). A crash sensor, preferably an electronic crash sensor, initiates inflation of the airbag(s) via the inflator upon a determination of a crash requiring inflation of the airbag(s). The crash sensor includes a sensor housing arranged within and/or proximate to the system housing, and a sensing mass arranged in the sensor housing to move relative to the sensor housing in response to accelerations of the sensor housing resulting from the crash into the first side of the vehicle. Upon movement of the sensing mass in excess of a threshold value, the crash sensor initiates the inflator means to inflate the airbag(s).

28 Claims, 19 Drawing Sheets

SELF-CONTAINED AIRBAG SYSTEM

CROSS REFERENCE TO RELATED APPLICATIONS

This application is a continuation-in-part of U.S. patent application Ser. No. 08/101,017 filed Sep. 16, 1993 now U.S. Pat. No. 5,842,716.

FIELD OF THE INVENTION

This invention relates to self-contained airbag systems and more particularly to self-contained side impact airbag systems.

BACKGROUND OF THE INVENTION

Self-contained airbag systems contain all of the parts of the airbag system within a single package, in the case of mechanical implementations, and in the case of electrical or electronic systems, all parts except the primary source of electrical power and, in some cases, the diagnostic system. This includes the sensor, inflator and airbag. Potentially these systems have significant cost and reliability advantages over conventional systems where the sensor(s), diagnostic and backup power supply are mounted separate from the airbag module. In mechanical implementations in particular, all of the wiring, the diagnostic system and backup power supply are eliminated. In spite of these advantages, self-contained airbag systems have only achieved limited acceptance for frontal impacts and have so far not been considered for side impacts.

The "all-mechanical" self-contained systems were the first to appear on the market for frontal impacts but have not been widely adopted partially due to their sensitivity to accelerations in the vertical and lateral directions. These cross-axis accelerations have been shown to seriously degrade the performance of the most common all mechanical design that is disclosed in Thuen, U.S. Pat. No. 4,580,810. Both frontal and side impact crashes frequently have severe cross-axis accelerations.

Additionally, all-mechanical self contained airbag systems, such as disclosed in the Thuen patent, require that the sensor be placed inside of the inflator which increases the strength requirements of the inflator walls and thus increases the size and weight of the system. One solution to this problem appears in Breed, U.S. Pat. No. 4,711,466, but has not been implemented. This patent discloses a method of initiating an inflator through the use of a percussion primer in combination with a stab primer and the placement of the sensor outside of the inflator. One disadvantage of this system is that a hole must still be placed in the inflator wall to accommodate the percussion primer that has its own housing. This hole weakens the wall of the inflator and also provides a potential path for gas to escape.

Another disadvantage in the Thuen system that makes it unusable for side impacts, is that the arming system is sealed from the environment by an O-ring. This sealing method may perform satisfactorily when the module is mounted in the protected passenger compartment but it would not be satisfactory for side impact cases where the module would be mounted in the vehicle door where it can be subjected to water, salt, dirt, and other harsh environments.

Self-contained electrical systems have also not been widely used. When airbags are used for both the driver and the passenger, self-contained airbag systems require a separate sensor and diagnostic for each module. In contrast to mechanical systems the electronic sensor and diagnostic systems used by most vehicle manufacturers are expensive. This duplication and associated cost required for electrical systems eliminates most of the advantages of the self contained system.

Sensors located in the passenger compartment of a vehicle can catch most airbag-required crashes for frontal impacts, particularly if the occupants are wearing seatbelts. However, researchers now believe that there are a significant number of crashes which cannot be sensed in time in the passenger compartment and that this will require the addition of another sensor mounted in the crush zone (see, for example, Breed, D. S., Sanders, W. T. and Castelli, V. "A Critique of Single Point Sensing", Society of Automotive Engineers Paper No. 920124). If true, this will eventually eliminate the use of self-contained airbag systems for frontal impacts.

Some of these problems do not apply to side impacts mainly because side impact sensors must trigger in a very few milliseconds when there is no significant signal at any point in the vehicle except where the car is crushing or location rigidly attached to this crush zone. Each airbag system must be mounted in the crush zone and generally will have its own sensor. Self contained airbag systems have heretofore not been used for occupant protection for side impacts which is largely due to the misconception that side impact sensing requires the use of elongated switches as is discussed in detail in U.S. Pat. No. 5,231,253, incorporated by reference herein. These elongated prior art side impact crush-sensing switches are not readily adaptable to the more compact self-contained designs. The realization that a moving mass sensor was the proper method for sensing side impacts has now led to the development of the side impact self contained airbag system of this invention. The theory of sensing side impacts is included in the '253 patent referenced above.

In electromechanical and electronic self-contained modules, the backup power supply and diagnostic system are frequently mounted apart from the airbag system. If a wire is severed during a crash but before the airbag deploys, the system may lose its power and fail to deploy. This is more likely to happen in a side impact where the wires must travel inside of the door. For this reason, mechanical self-contained systems have a significant reliability advantage over conventional electrical systems.

Finally, the space available for the mounting of airbag systems in the doors of vehicles is frequently severely limited making it desirable that the airbag module be as small as possible. Conventional gas generators use sodium azide as the gas generating propellant. This requires that the gas be cooled and extensively filtered to remove the sodium oxide, a toxic product of combustion. This is because the gas in exhausted into the passenger compartment where it can burn an occupant and is inhaled. If the gas is not permitted to enter the passenger compartment, the temperature of the gas can be higher and the products of combustion can contain toxic chemicals, such as carbon dioxide.

These and other problems associated with self contained airbag systems are solved by the invention disclosed herein.

OBJECTS AND SUMMARY OF THE INVENTION

This invention is primarily concerned with a novel self-contained airbag system for protecting occupants in side impacts. This is accomplished by using the sensors described in U.S. Pat. No. 5,231,253 referenced above, along with other improvements described in detail below. This invention is secondarily concerned with applying some of the features of the novel side impact system to solving some of the problems of prior art all mechanical airbag systems discussed above.

The sensitivity to cross axis accelerations of current all mechanical airbag systems, for example, is solved in the present invention, as discussed in U.S. Pat. No. 5,233,141, incorporated by reference herein, through the substitution of a hinged sensing element for the ball sensing mass in the Thuen patent.

The problems resulting from the hole in the inflator wall when a percussion primer is used as in Breed, U.S. Pat. No. 4,711,466, are solved in the present invention through the placement of sensitive pyrotechnic material in a cavity adjacent to the outside wall of the inflator and then using shock from a stab primer to initiate the pyrotechnic material and thus the inflator. An alternate solution, as discussed below, is to make the size of the hole created in the inflator by the action of the stab primer small so that the total quantity of gas which escapes into the sensor is small compared with the quantity of gas used to inflate the airbag.

Finally, in the self-contained airbag system disclosed herein, provision is made to exhaust the gas outside of the passenger compartment, into the vehicle doors, or other side areas of the vehicle. This permits the use of higher gas temperatures and alternate propellant formulations, such as nitro-cellulose, which produce toxic combustion products. Both of these changes reduce the size, weight and cost of the system.

Briefly, the self-contained airbag system of this invention consists of a sensor having a movable sensing mass, means to sense the position of the sensing mass to determine if the airbag should be deployed, a sealed housing, a gas generator for producing the gas to inflate the airbag, an airbag, and mounting hardware.

The principal objects and advantages of this invention are:
1. To provide a self contained side impact occupant protection airbag system incorporating the advantages of a movable mass sensor resulting in a low cost, compact airbag system.
2. To provide a frontal impact all mechanical airbag system incorporating a hinged sensing mass to eliminate the effects of cross-axis accelerations on the operation of the sensor.
3. To provide a method of minimizing the leakage of the inflator gases out of the inflator portion of a self contained airbag system into the sensor portion and the associated problems.
4. To provide a side impact airbag system which utilizes the crush of the vehicle side to arm the sensor and motion of a sensing mass to initiate deployment.
5. To provide a method of hermetically sealing a self contained airbag system while permitting an external force to be used to arm the system.
6. To provide a more compact self contained side impact airbag system by providing for the exhausting of the airbag gas into the vehicle door or side, therefore permitting the use of higher temperature gas and propellants which would otherwise not be viable due to their toxic products.
7. To provide an all-mechanical airbag system utilizing a cantilevered firing pin spring which also provides the biasing force on the sensing mass thereby providing a simplified design.
8. To provide an all-mechanical airbag system with a thin sensor mounted outside of the inflator housing but in line with it to reduce the size of the system and permit the use of conventional inflator designs.
9. To provide a highly reliable side impact occupant protection electromechanical self-contained airbag system.
10. To provide a highly reliable side impact occupant protection electronic self contained airbag system.
11. To provide a method of obtaining the power for an electrical self contained airbag system from other components within the door thereby minimizing the requirement for separate wiring for the airbag system.
12. To provide a power supply within the self contained module and a simplified diagnostic system for an electrical self contained airbag system.
13. To provide a self contained airbag system design that permits the arming of the sensor after it has been mounted onto the vehicle but before the inflator is mounted to provide greater safety against unwanted deployments.

Other objects and advantages will become apparent from the discussion below.

In one embodiment of a side impact airbag system for a vehicle, the airbag system comprises a system housing defining an interior space and arranged on the first side of the vehicle alongside at least a portion of a passenger compartment of the vehicle, one or more inflatable airbags arranged in the interior space of the system housing such that when inflating, the airbag(s) is/are expelled from the system housing into the passenger compartment, and inflator means arranged at least partially within the interior space of the system housing for inflating the airbag(s). The inflator means comprise an inflator housing containing propellant. The airbag system also includes a crash sensor for initiating inflation of the airbag(s) via the inflator means upon a determination of a crash requiring inflation thereof The crash sensor comprises a sensor housing arranged within the system housing, proximate thereto and/or mounted thereon, and a sensing mass arranged in the sensor housing to move relative to the sensor housing in response to accelerations of the sensor housing resulting from the crash into the first side of the vehicle. Upon movement of the sensing mass in excess of a threshold value, the crash sensor initiates the inflator means to inflate the airbag(s). The threshold value may be the maximum motion of the sensing mass required to determine that a crash requiring deployment of the airbag(s) is taking place.

The crash sensor may be an electronic sensor and the movement of the sensing mass is monitored. The electronic sensor generates a signal representative of the movement of the sensing mass that may be monitored and recorded over time. The electronic sensor may also include a microprocessor and an algorithm for determining whether the movement over time of the sensing mass as processed by the algorithm results in a calculated value that is in excess of the threshold value based on the signal.

In some embodiments, the crash sensor also includes an accelerometer, the sensing mass constituting part of the accelerometer. For example, the sensing mass may be a micro-machined acceleration sensing mass in which case, the electronic sensor includes a micro-processor for determining whether the movement of the sensing mass over time results in an algorithmic determined value which is in excess of the threshold value based on the signal. In the alternative, the accelerometer includes a piezo-electric element for generating a signal representative of the movement of the sensing mass, in which case, the electronic sensor includes a micro-processor for determining whether the movement of the sensing mass over time results in an algorithmic determined value which is in excess of the threshold value based on the signal.

The inflator means may be any component or combination of components which is designed to inflate an airbag, preferably by directing gas into an interior of the airbag. One embodiment of the inflator means may comprise a primer. In this case, the crash sensor includes an electronic circuit including the accelerometer and the primer such that upon movement over time of the sensing mass results in a calculated value in excess of the threshold value, the electronic circuit is completed thereby causing ignition of the primer.

The system housing may comprise a mounting plate having a bottom wall and flanged side walls, the bottom wall having an aperture, whereby the inflator housing is arranged in the aperture. The system housing may be arranged inside a door of the vehicle or between inner and outer panels not associated with a door of the vehicle.

The airbag system may also include a capacitor arranged within the system housing to supply power to initiate deployment of the airbag system and an electronic diagnostic system arranged within the system housing to permit diagnoses of a fault within the airbag system.

Another embodiment of an airbag safety restraint system for a vehicle including an electronic crash sensor comprises an inflatable airbag having an interior, and an inflator assembly having an inflator housing, an ignitable gas generating material contained in the inflator housing and at least one passage extending between the gas generating material and the interior of the airbag such that upon ignition of the gas generating material, gas is generated and flows through the at least one passage into the interior of the airbag to inflate the airbag. The electronic crash sensor causes ignition of the gas generating material upon a determination of a crash requiring inflation of the airbag and comprises a sensor housing, a sensing mass arranged in the sensor housing to move relative to the sensor housing in response to accelerations of the sensor housing resulting from the crash whereby a signal representative of the movement of the sensing mass is generated, and a micro-processor comprising an algorithm for determining whether the movement of the sensing mass over time results in a calculated value which is in excess of a threshold value based on the signal. If the movement over time of the sensing mass results in a calculated value that is in excess of the threshold value, the micro-processor causes ignition of gas generating material and thus inflation of the airbag.

The sensor housing may be mounted proximate to the inflator housing. The crash sensor may include an accelerometer whereby the sensing mass constitutes part thereof, e.g., a micro-machined element, or the accelerometer may include a piezo-electric element. The inflator assembly may include a primer for igniting the gas generating material whereby the crash sensor includes an electronic circuit including the accelerometer and the primer such that upon movement of the sensing mass over time resulting in a calculated value in excess of the threshold value, the electronic circuit is completed thereby causing ignition of the primer.

Yet another embodiment of an airbag safety restraint system for a vehicle including an electronic crash sensor comprises, in addition to the inflatable airbag and inflator assembly described immediately above, a sensor housing, and an accelerometer arranged in the sensor housing and including a sensing mass movable relative to the sensor housing in response to accelerations of the sensor housing resulting from the crash. The accelerometer is arranged to generate a signal representative of the movement of the sensing mass over time. The crash sensor is arranged to cause ignition of the gas generating material if the movement over time of the sensing mass represented by the signal results in a calculated value that is in excess of a threshold value. The sensor housing may mounted proximate to or directly on the inflator housing. The sensing mass may be a micro-machined element. The accelerometer may also include a piezo-electric element for generating the signal. In another basic embodiment of the side impact airbag system in accordance with the invention, the system includes a system housing defining an interior space and which is arranged on the side of the vehicle alongside at least a portion of a passenger compartment of the vehicle, a sensor housing, a sensing mass arranged in the sensor housing to move relative to the sensor housing in response to accelerations of the sensor housing in excess of a predetermined threshold value resulting from impact into the first side of the vehicle, one or more inflatable airbags arranged in the interior space of the system housing such that when inflating, the airbag(s) is/are expelled from the system housing into the passenger compartment, and inflator means arranged at least partially within the interior space for inflating the airbag(s). The inflator means comprise an inflator housing containing propellant and the sensor housing is coupled to the inflator housing. The system also includes initiation means arranged in the sensor housing responsive to the movement of the sensing mass upon acceleration of the sensor housing for initiating the inflator means to inflate the airbag(s) and expel the same from the system housing into the passenger compartment.

The system housing may comprise a mounting plate having a bottom wall and flanged side walls, the bottom wall having an aperture in which the inflator housing is arranged. The inflator housing may include a first flanged housing section and a second housing section, the first housing section being arranged in the aperture such that a flanged portion of the first housing section abuts against the bottom wall, the sensor housing is connected to the first housing section. The sensor housing may comprise a top cover adapted to be situated most proximate an exterior of the vehicle and opposed wall portions cooperating to define a sealed interior space whereby the sensing mass is arranged in the interior space of the sensor housing. The initiation means may comprise a biasing spring arranged in the interior space of the sensor housing and releasably restrained by the sensing mass and a firing pin arranged in connection with the biasing spring.

In some embodiments, the sensor housing further comprises a bottom cover having an orifice arranged such that when the biasing spring is released from the sensing mass upon acceleration of the sensor housing, the firing pin passes through the orifice. In this case, the inflator means further comprise a stab primer located in the inflator housing adjacent the orifice and in a position to be impacted by the firing pin.

In the alternative, the stab primer is arranged in the interior space of the sensor housing in a position to be impacted by the firing pin when the biasing spring is released from the sensing mass upon acceleration of the sensor housing whereby initiation of the stab primer creates a shock which is transmitted through the sensor housing to the inflator assembly. The inflator assembly includes a shock sensitive pyrotechnic mix that ignites upon impact by the shock created upon initiation of the stab primer. The sensor housing thus may comprises a solid bottom cover arranged alongside the inflator housing.

The sensing mass may be pivotally coupled to the sensor housing to enable the mass to pivot about a vertical axis in response to accelerations of the sensor housing in excess of the predetermined threshold value resulting from impact into the side of the vehicle. The sensing mass may be substantially planar and square. The sensing mass may be arranged in the sensor housing for movement relative to the sensor housing only in response to accelerations of the sensor housing caused by the impact into the side of the vehicle.

Sealing means may be provided for hermetically sealing the sensor housing to prevent passage of moisture and contaminants into or out of the sensor housing. In one embodiment, the sealing means comprise a member cooperating at least with the inflator housing to surround the sensor housing within a closed, hermetically sealed compartment. When the inflator housing has first and second housing sections, the member may comprise a tubular section surrounding the first housing section of the inflator housing and a spherical section sealing an end of the tubular section and being situated over the sensor housing.

The sensor housing may comprise a side wall, a hinge for pivotally attaching the sensing mass to the side wall, and a releasable firing pin restrained by the mass. The inflator means are initiated by movement of the firing pin. The system housing is mounted such that upon a side impact causing acceleration of the sensor housing in excess of the predetermined threshold value, the sensing mass pivots about the hinge causing release of the firing pin, and thus initiating the inflator means to inflate the airbag(s). This sensing mass may also be cantilevered where the attachment to the wall performs the function of a hinge as in certain micro-machined accelerometer designs.

In some embodiments, crush detecting means are provided for preventing movement of the sensing mass in response to accelerations of the sensor housing in excess of the predetermined threshold value resulting from impact into the first side of the vehicle until crush of the first side of the vehicle is detected. Thus, the sensor will actuate only upon crush of the vehicle and a sufficient velocity change. The crush detecting means comprise a sensor can surrounding the sensor housing and including an outer cover and a tubular wall defining an interior space in which the sensor housing is situated. The crush detecting means may also include a spherical pusher member adapted to receive a force from the outer cover upon crush of the first side of the vehicle, a first lever adapted to be pushed by the pusher member and hingedly mounted at one end thereof to the sensor housing to enable it to rotate about an attachment point to the sensor housing, and a second lever hingedly connected at a first end to the first lever and pivotally connected to the sensor housing. The second lever has a second end extending through an aperture in a wall of the sensor housing and restraining the sensing mass from movement whereby rotation of the second lever causes the second end of the second lever to pull out of the sensor housing.

The vehicle may include a pusher plate arranged in a side door on the first side of the vehicle whereby the system housing is arranged alongside at least a portion of the pusher plate.

In certain embodiments, the initiation means comprise a first electrical spring contact biased against the sensing mass and a second electrical contact arranged on the top cover of the sensor housing whereby upon movement of the sensing mass, the first contact is caused to engage the second contact and complete an electrical circuit.

As to mounting of the system housing, the system housing is mounted such that the sensor housing is usually closer to an exterior of the side of the vehicle than the inflator housing and thus more forwardly in a side impact crash direction than the inflator housing. The system housing may be arranged inside a door of the vehicle or between inner and outer panels of a section other than the door of the vehicle.

BRIEF DESCRIPTION OF THE DRAWINGS

The invention will be described with reference to the following non-limiting drawings in which.

DETAILED DESCRIPTION OF THE PREFERRED EMBODIMENTS

Figure 1:
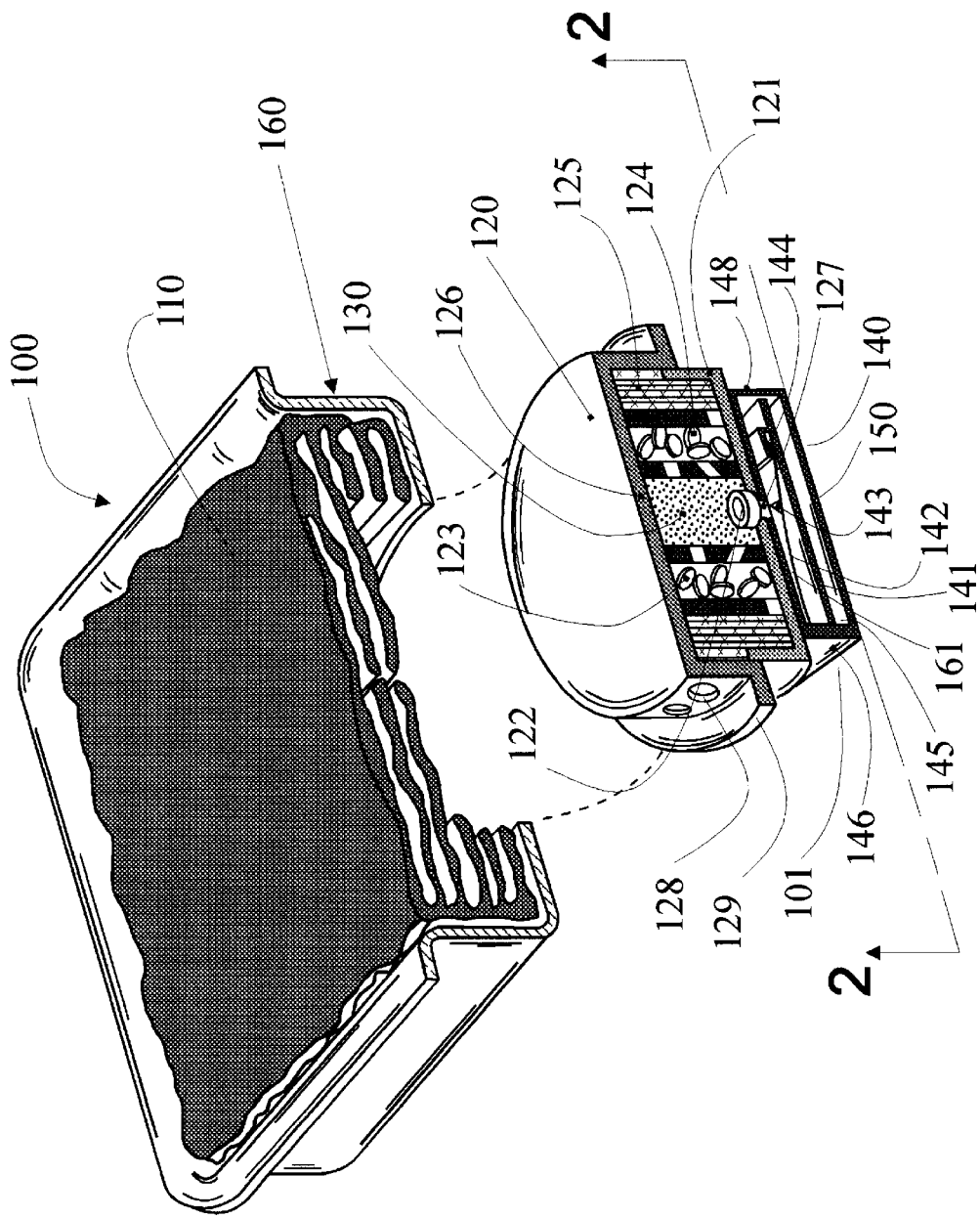
FIG. 1 is a perspective view with certain parts removed of an all mechanical self contained airbag system for mounting on the side of a vehicle to protect occupants in side impacts.
Figure 2:
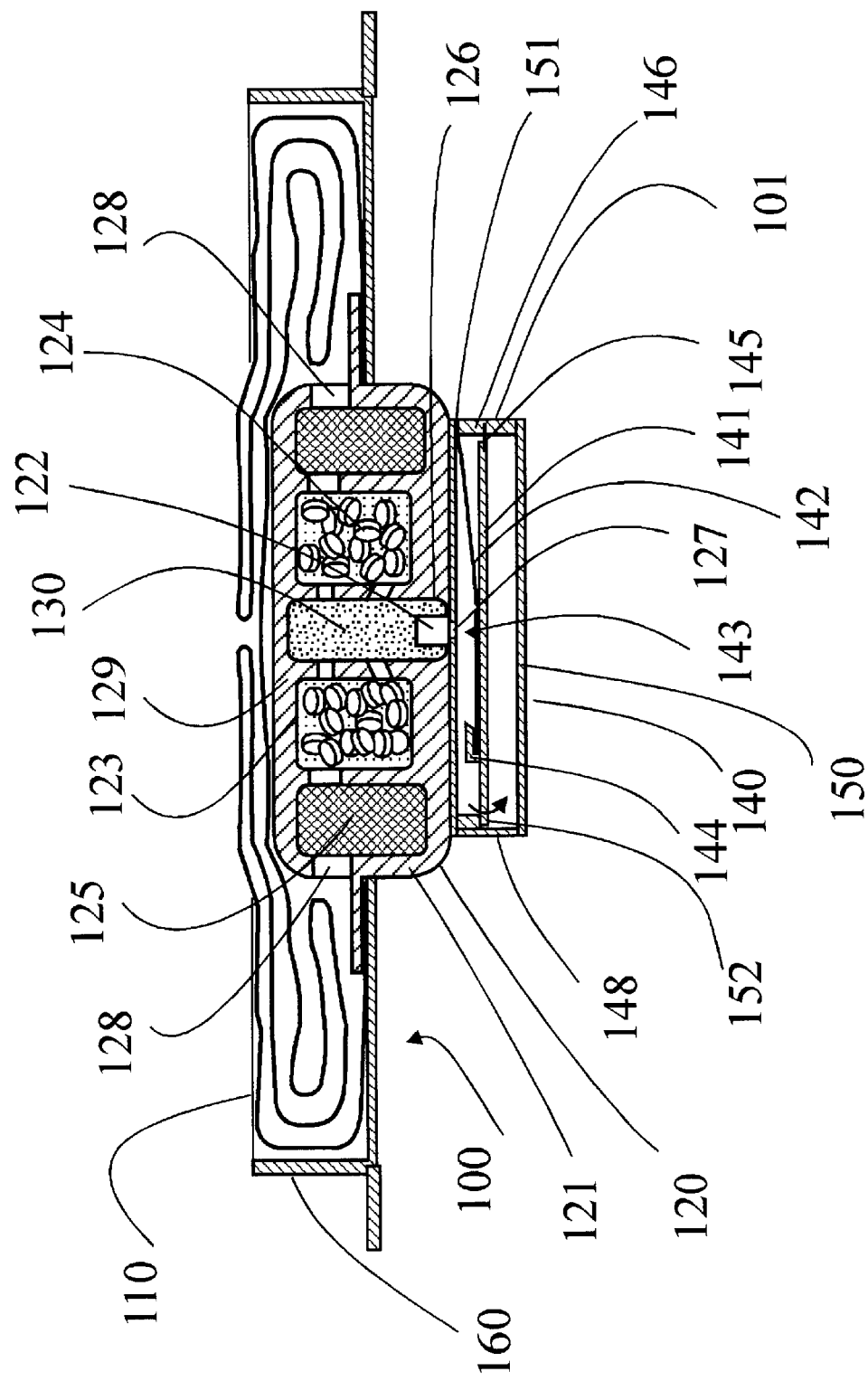
FIG. 2 is a cross sectional view of the apparatus of FIG. 1 taken along line 2—2.

Referring to the accompanying drawings wherein like reference numerals refer to the same or similar elements, FIGS. 1 and 2 show an all-mechanical self-contained airbag system for mounting on the side of a vehicle to protect occupants in side impacts in accordance with the invention which is designated generally as 100. The airbag system 100 contains one or more inflatable airbags 110, an inflator assembly 120, a mounting plate 160 for mounting the airbag system 100 on the side of the vehicle and a sensor assembly 140 mounted to the inflator assembly 120. The sensor assembly 140 contains a rotatable, substantially planar sensing mass 141 and a cantilevered biasing spring 142 which performs the dual purposes of biasing the sensing mass 141 toward its at rest position shown in FIG. 2 and also providing the energy to the firing pin 143 required to initiate a stab primer 122 as further described below. The sensing mass 141 contains a firing pin spring-retaining portion 144 that restrains the firing pin 143 during the sensing time and releases it when the sensing mass 141 has rotated through the sensing angle. The retaining portion 144 is an L-shaped descending part formed on a planar surface of the sensing mass 141 and defines a cavity for retaining an end of the spring 142.

As shown in FIG. 1, the mounting plate 160 constitutes a housing for the airbag system 100, i.e., it has a bottom wall and flanged side walls extending from edges of the bottom wall which define an interior space in which the airbag(s) 110 and a portion of the inflator assembly 120 are arranged. The bottom wall is substantially flat and has a substantially circular aperture. The inflator assembly 120 is positioned in the aperture so that a portion thereof extends on either side of the bottom wall (See FIG. 2). Also as shown in FIG. 2, the housing of the inflator assembly 120 includes a flange that abuts against the bottom wall of mounting plate 160 around the aperture. As will be appreciated by those skilled in the art, the flanged side walls of the mounting plate 160 are positioned around a panel on the side of the vehicle, e.g., a blow-out panel in the side door, so that the airbag(s) 110 when inflating will be expelled from the interior space defined by the mounting plate 160 into the passenger compartment of the vehicle. The mounting plate 160 may thus be mounted to a frame of the side door by attaching the flanged side walls to the frame or attaching another portion of the mounting plate to the frame. The actual manner in which the mounting plate 160 is mounted in the side door, or on the side of the vehicle, is not critical so long as the mounting plate 160 is positioned to allow the airbag(s) 110 to be expelled from the interior space into the passenger compartment. Mounted as such, the sensor assembly 140 will be most proximate the exterior of the vehicle with the airbag 110 most proximate the passenger compartment of the vehicle.

The sensing mass 141 is connected to the housing 101 of sensor assembly 140 through a hinge 145 at one end whereby the opposed end is unrestrained so that the sensing mass 141 rotates about the hinge 145. In view of the mounting of the airbag system 100 on the side of the vehicle, hinge 145 defines a rotation axis which is perpendicular to the longitudinal direction of travel of the vehicle (x) as well as perpendicular to a direction (y) transverse to the longitudinal direction of travel of the vehicle, i.e., it is a vertical axis (z).

The sensor housing 101 includes opposed housing wall portions 146 and 148, a top cover 150 and a bottom cover 151 which is connected to, mounted on or the same part as a top cover 121 of the inflator assembly 120. The sensor housing 101 is filled with air and sealed (when appropriately mounted to the inflator assembly 120 whereby a small orifice 127 in bottom cover 151 is closed by the inflator assembly 120) so to maintain a constant air density regardless of the ambient temperature or pressure. The sensor housing walls 146,148 and sensing mass 141 are preferably molded along with the hinge 145 in a single insert molding operation to provide a careful control of the dimensions of the parts and particularly of a clearance 152 between the walls 146,148 and the sensing mass 141 for the reasons described below.

The inflator assembly 120 comprises a stab primer 122, igniter mix 130 associated with the stab primer 122, one or more propellant chambers 123 containing propellant 124 and a series of cooling and filtering screens 125. In the particular design shown in FIGS. 1 and 2, the stab primer 122 has been placed inside of an igniter housing portion 126 of the housing of the inflator assembly 120, the housing of the inflator assembly being formed by opposed housing sections 121 and 129. Housing sections 121 and 129 cooperate to define a substantially cylindrical housing for the inflator assembly 120. Housing section 121 is coupled to the sensor housing 101. Exit orifices 128 are provided in the housing section 129 to allow the gas generated by the burning propellant 124 to flow into the airbag 110 to inflate the same. A small orifice 127 has been left open in the bottom cover 151 of the housing 101 of the sensor assembly 140, as well as the housing section 121, to allow the firing pin 143 to enter into the interior of the inflator assembly 120 and cause initiation of the stab primer 122. The stab primer 122 is from a family of the most sensitive stab primers requiring less than 25 in-oz of energy for activation. The standard M55 military detonator is a member of this class and has been manufactured in very large quantities during war time. For the purposes of this disclosure, the term primer will be used to represent both primers and detonators. The small orifice 127 will permit some gas to enter the sensor housing 101 during the time that the propellant 124 is burning and inflating the airbag 110 but since its area is less than 1% of the area of the exit orifices 128 through which the generated gas enters the airbag 110, less than 5% of the generated gas will pass into the sensor. Naturally, a larger orifice could be used but in all cases the amount of gas which passes into the sensor housing 101 will be less than 10% of the total gas generated. Since this gas will be hot, however, it will destroy the sensor assembly 140 and leak into the door. In another implementation discussed below, a through bulkhead initiation system is used to prevent any gas from passing into the sensor assembly from the inflator assembly.

During operation of the device, sensing mass 141 rotates relative to sensor housing 101 in the direction of the arrow (shown in FIG. 2) under the influence of the acceleration with its motion being retarded by the biasing spring 142 and the gas pressure forces. Upon a sufficient rotation, biasing spring 142 is released from the retaining portion 144 of the sensing mass 141 and moves toward the inflator assembly 120 and the firing pin 143 formed in connection with the biasing spring 142 moves to impact stab primer 122 which burns and ignites the igniter mix 130. The igniter mix, which is typically composed of boron and potassium nitrate, then ignites the propellant 124 that burns and generates gas. The gas then flows through exit orifices 128 into the inflatable bag 110, inflating the bag.

In the embodiment shown in FIGS. 1 and 2, the stab primer 122 has been located in the center of the inflator housing. This is the conventional location for electrical primers in most driver's side inflator designs. The sensor is placed adjacent and in line with the inflator permitting the use of conventional inflator designs which minimize the size, complexity and weight of the inflator. The sensing mass 141 is approximately of square shape and the sensor housing 101 is made circular to mate with the inflator design.

In the particular design shown in FIGS. 1 and 2, a burning propellant inflator design was illustrated. Naturally, other propellant technologies such as a stored gas or hybrid (a combination of stored gas and propellant) could have been used without departing from the teachings of this invention.

It will be appreciated by those skilled in the art that since the airbag system 100 is designed to activate in side impacts, the sensing mass 141 is arranged for movement in a direction perpendicular to the sides of the vehicle, i.e., perpendicular to the longitudinal direction of travel of the vehicle, or in a pivoting movement about a vertical pivot axis. In this manner, the acceleration of the sensor housing 101 inward into the passenger compartment resulting from a crash into the side of the vehicle, will cause the sensing mass 141 to move or pivot outward toward the impacting object thereby releasing its hold on the biasing spring 142.

Figure 3:
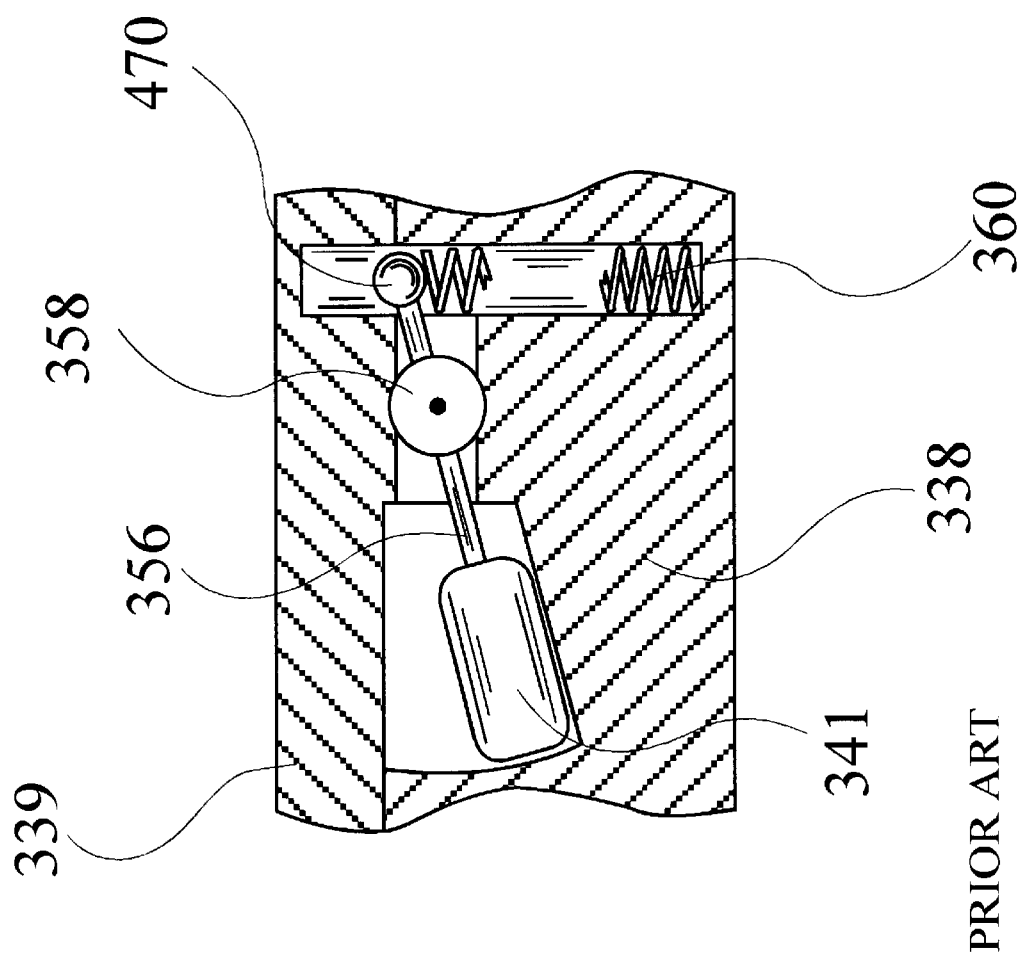
FIG. 3 is an enlarged fragmentary view of the sensing mass and attached lever arm extending from the D-shaft prior to rotation of the sensing mass incident to a crash as adapted to the all mechanic system of U.S. Pat. No. 4,580,810.
Figure 4:
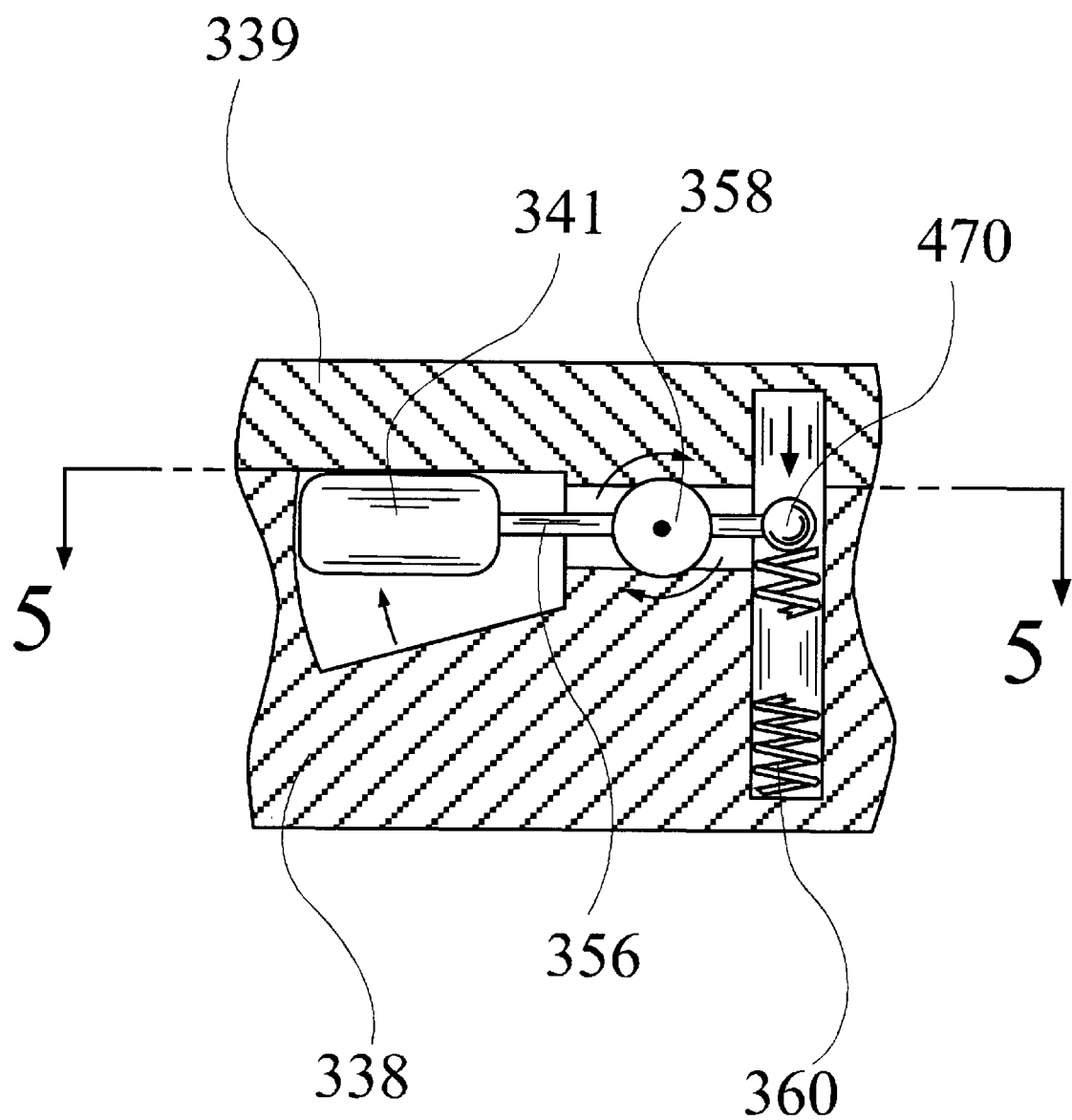
FIG. 4 is a similar view as FIG. 3 showing the sensing mass rotated as a result of a crash.
Figure 5:
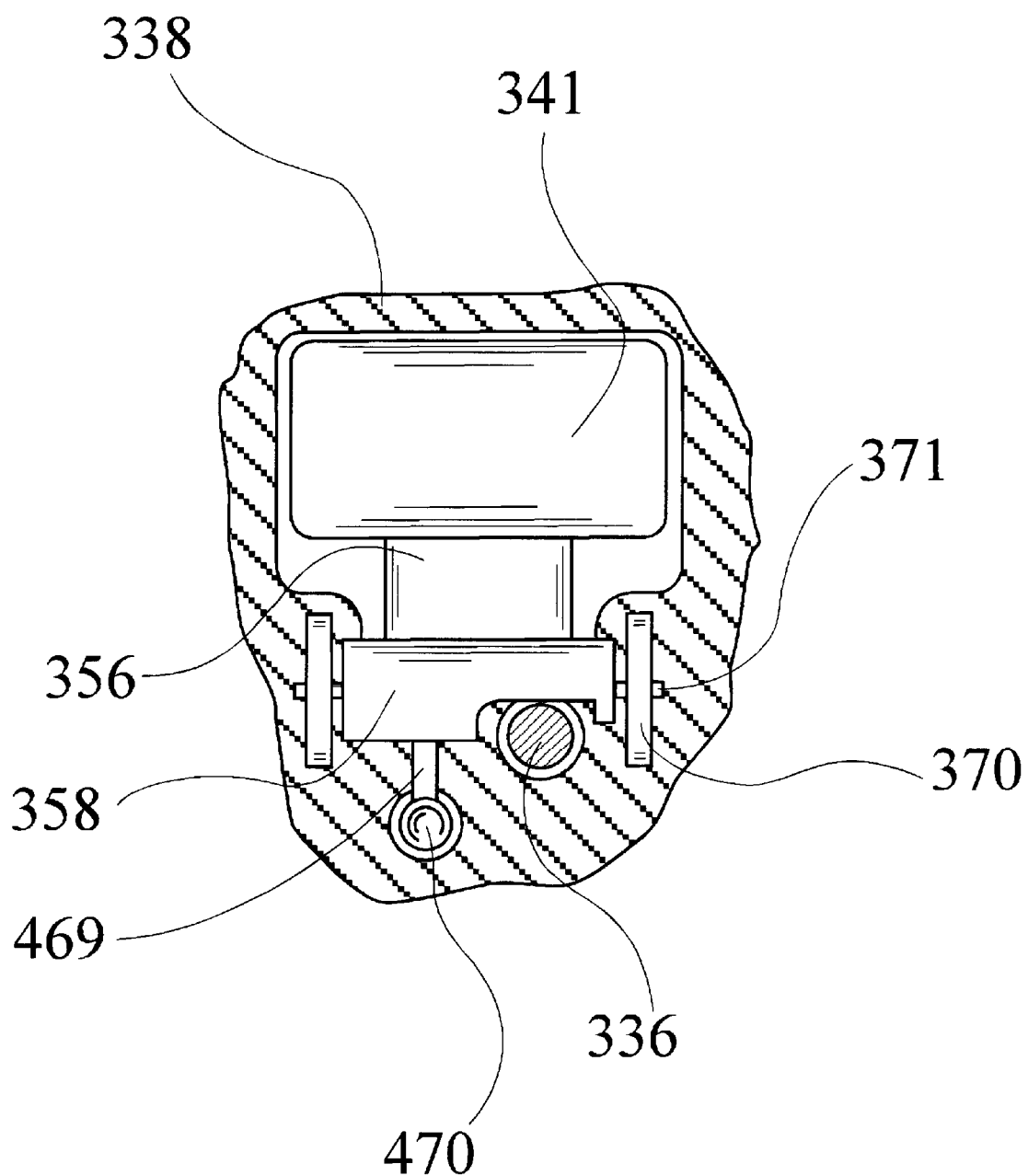
FIG. 5 is a view of the apparatus shown in FIG. 4 taken along line 5—5 and rotated 90 degrees to the right.
Figure 7:
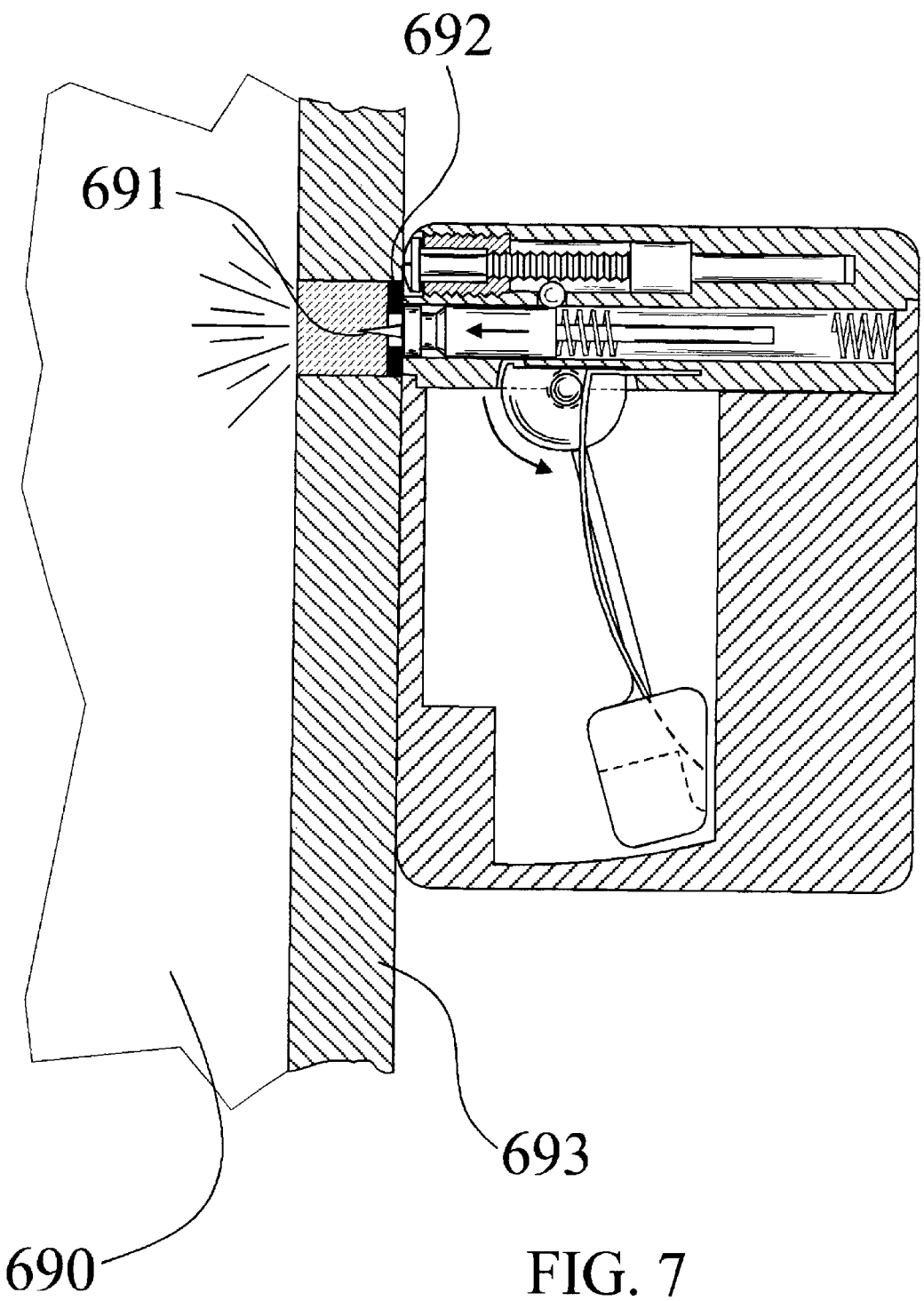
FIG. 7 is a cross section view of the sensor of FIG. 6 shown mounted on an inflator, shown in a fragmentary view, after it has triggered in response to a vehicle crash.
Figure 8:
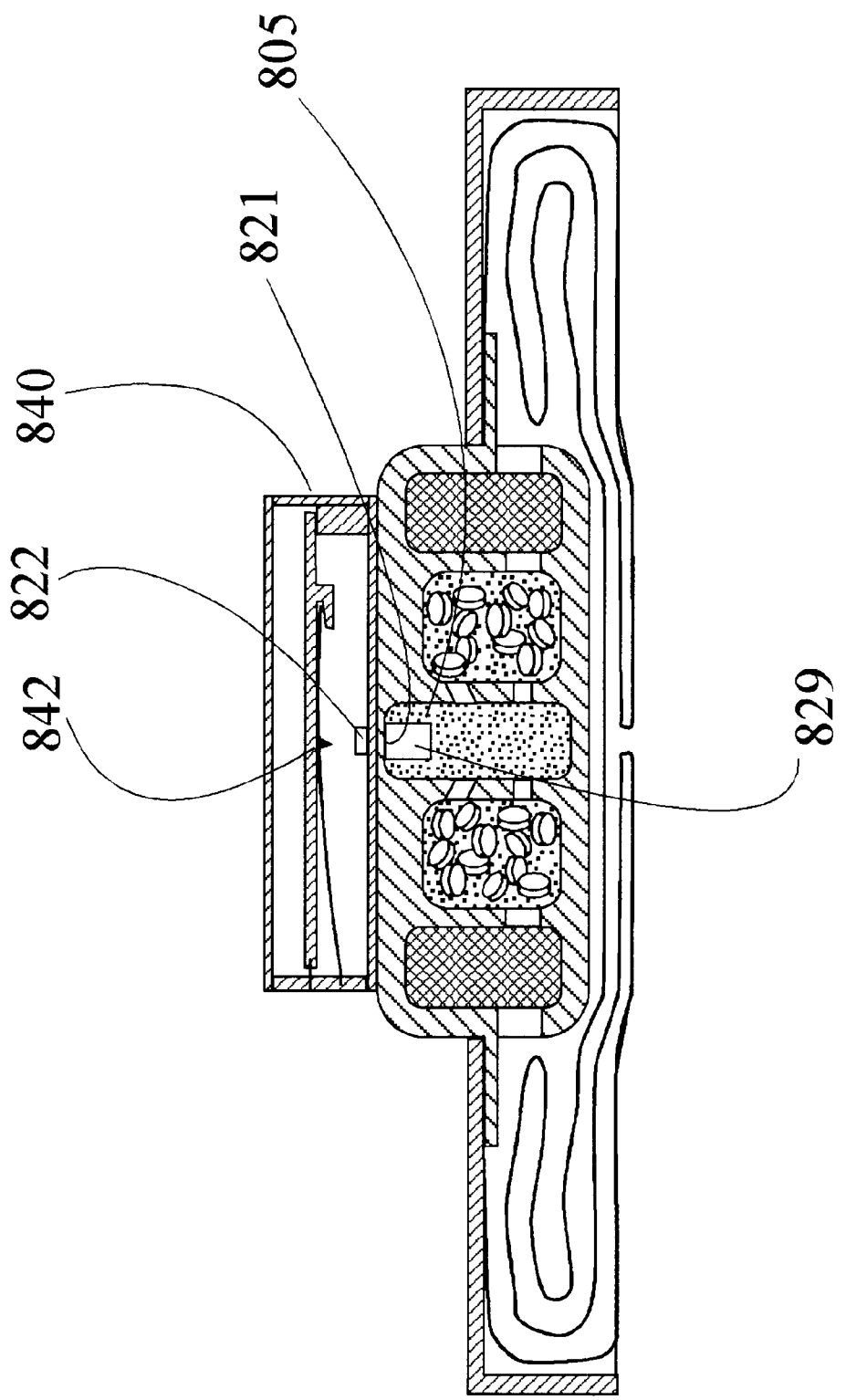
FIG. 8 is a cross section view of a through bulkhead initiation system adapted to a mechanical self contained airbag system.
Figure 9:
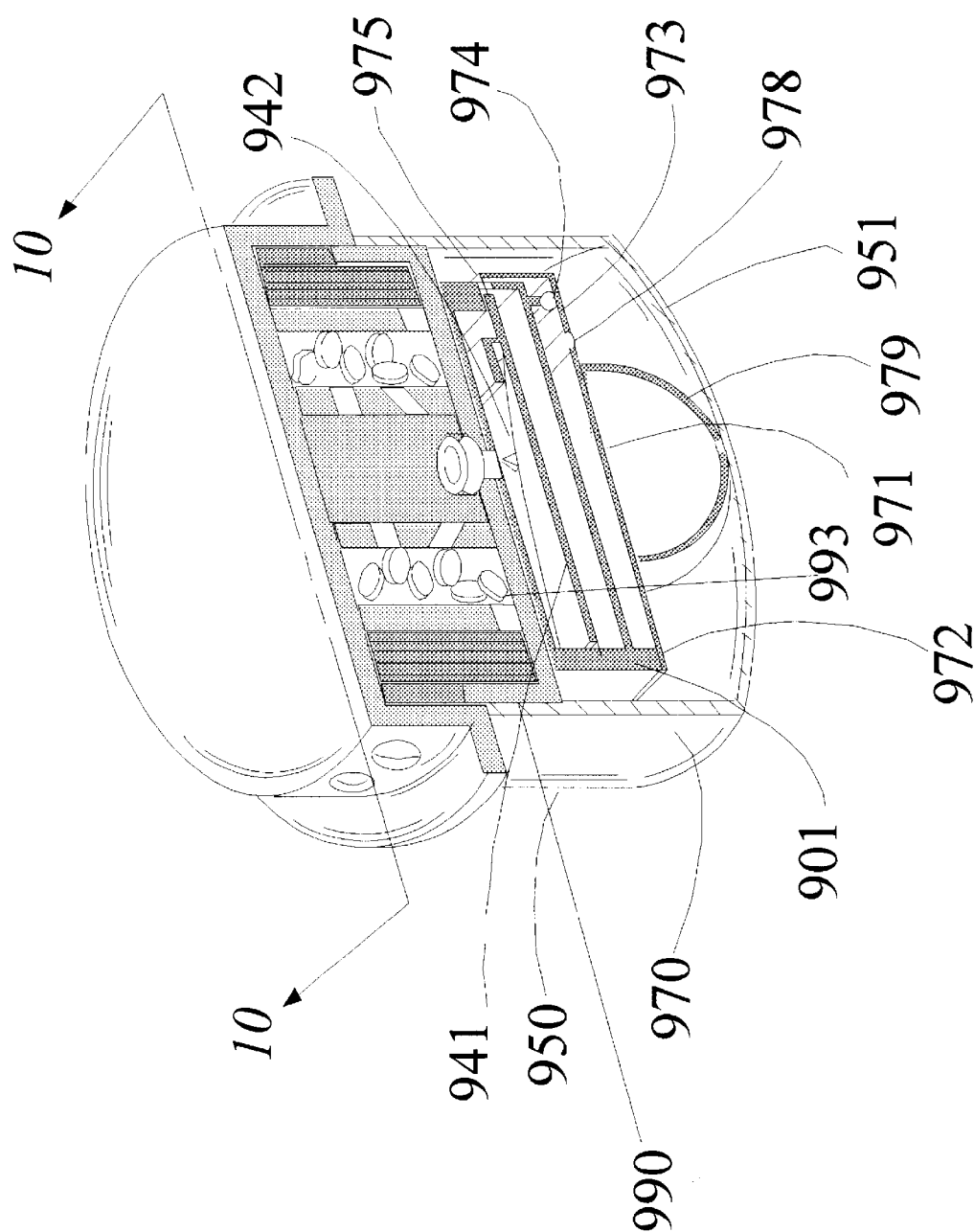
FIG. 9 is a perspective view of a mechanical self contained airbag system using a crush sensing arming system, shown in the state before a crash occurs.
Figure 9A:
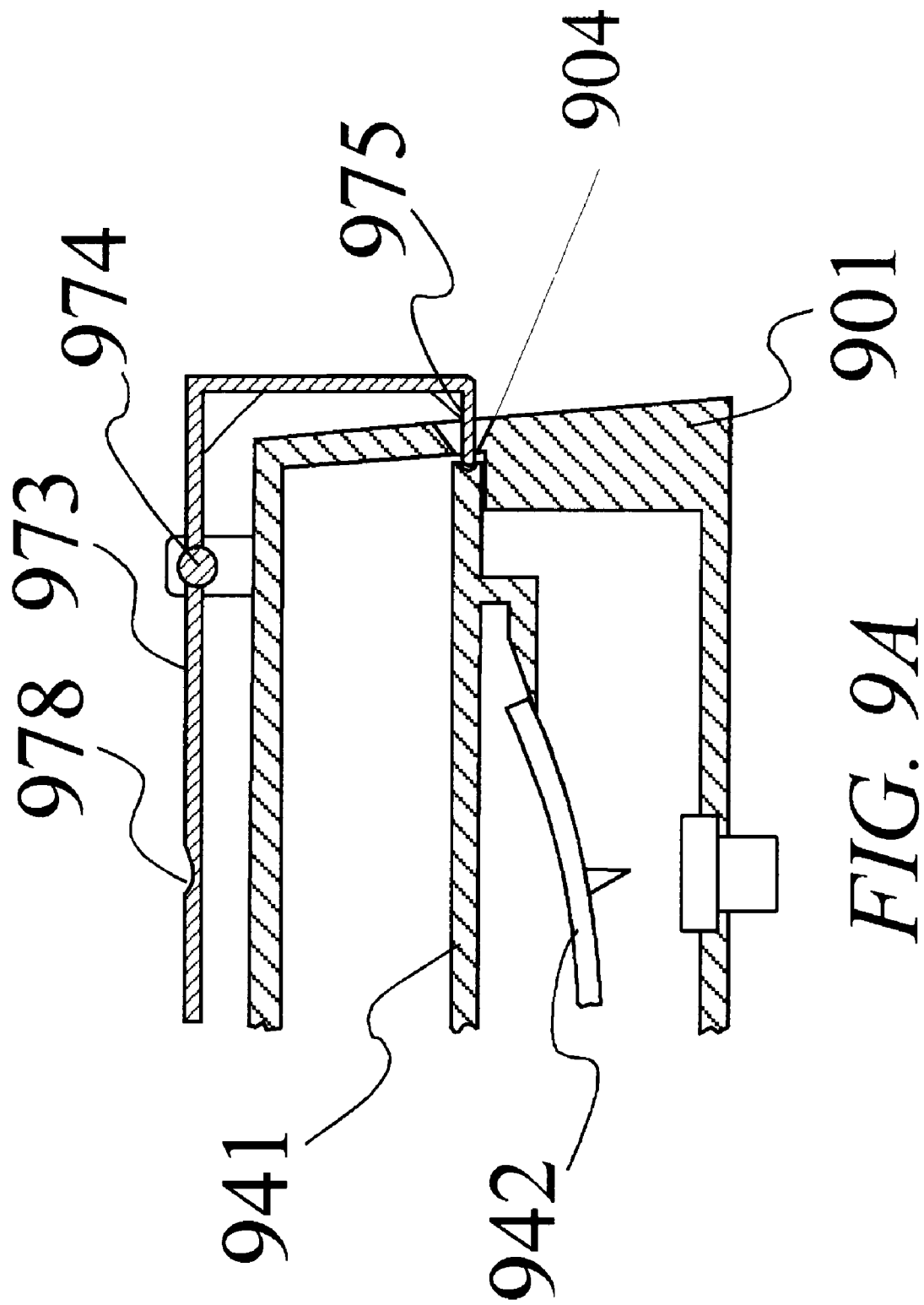
FIG. 9A is a blowup with certain parts removed showing a portion of the sensor shown in FIG. 9 in the unarmed position.

FIG. 3 shows a fragmentary view of a sensing mass 341 and an attached lever arm 356 extending from a D-shaft 358 prior to rotation of the sensing mass incident to a crash as adapted to the all-mechanical system of Thuen, U.S. Pat. No. 4,580,810. This figure corresponds to FIG. 6 of the Thuen patent and shows the improved sensing mass design. FIG. 4 shows the same view as FIG. 3 with the sensing mass rotated, under the torque from spring 360 acting on ball 470, into the actuating position where it has released the firing pin to initiate deployment of the airbag. FIG. 4 corresponds to FIG. 7 in the '810 patent. FIG. 5 is a view taken along line 5—5 of FIG. 4 and shows the shape of the sensing mass 341. Sensing mass 341 is retained in sensor housing 338, by cover 339, and rotates with D-shaft 358. This rotation is facilitated by pivots 371, which form part of the D-shaft, and pivot plates 370. In this manner, the sensing mass 341 is hinged to the sensor housing 338 permitting only rotational motion and rendering the sensor insensitive to the effects of cross-axis accelerations. In this embodiment, sensing mass 341, lever arm 356, ball 470, pin 469 and the D-shaft 358 are all made as one part that reduces the cost of the assembly. Naturally, they could be made as separate parts and assembled. When D-shaft 358 rotates through a sufficient angle, it releases firing pin 336 in the same manner as shown in FIGS. 8 and 9 of the '810 patent. The motion of the sensing mass 341 is undamped since the clearance between the sensing mass 341 and sensor housing 338 is sufficiently large so as to minimize the flow resistance of the air as the mass rotates. Naturally, in another implementation, the mass could be redesigned to have its motion damped by the flow of a gas in the manner shown in FIGS. 1 and 2 above. Also, two sensor systems of the type disclosed in FIGS. 3–5 can be used in the all-mechanical system in a similar way as shown in the '810 patent.

Figure 6:
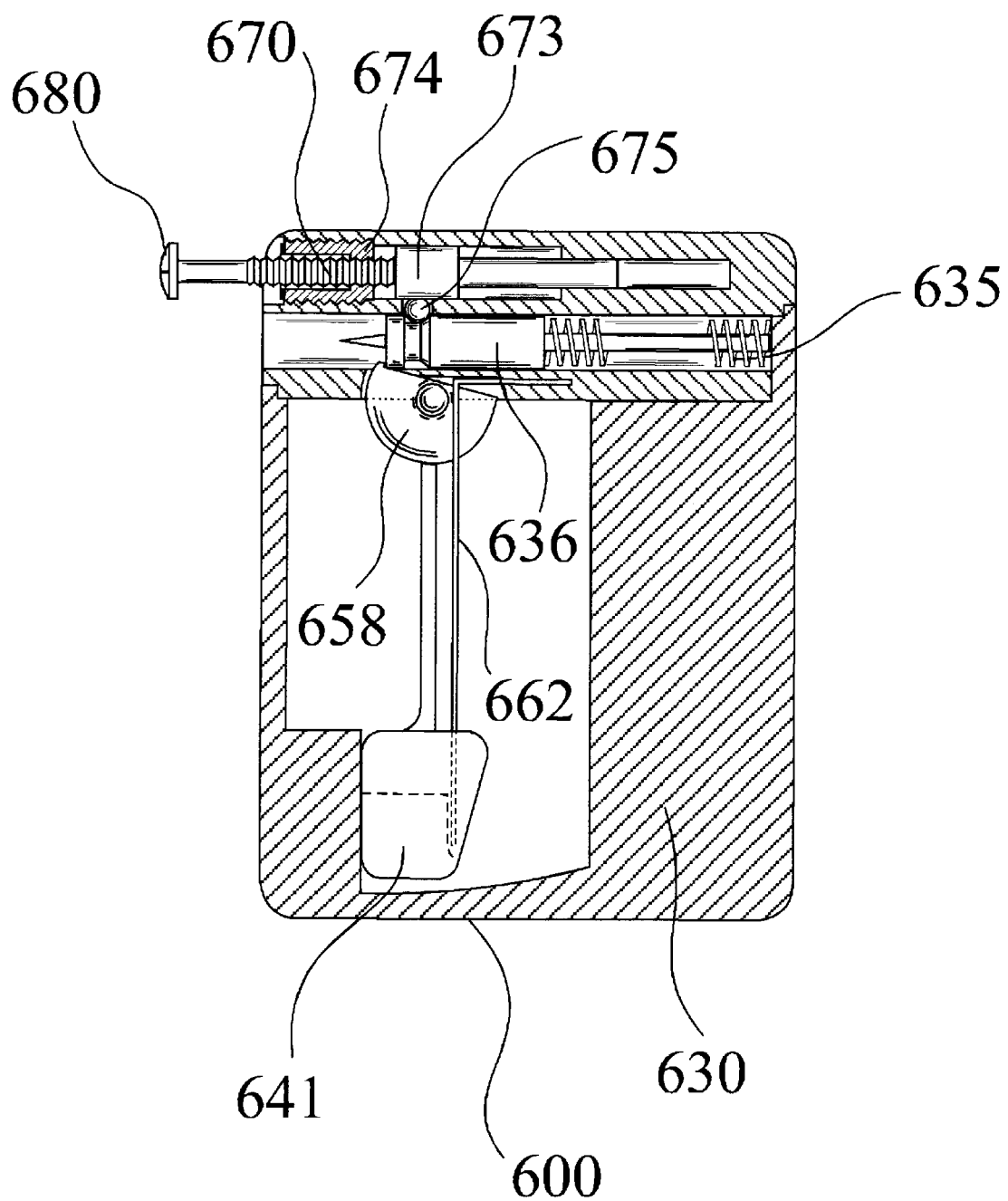
FIG. 6 is a cross section view of a sensor for use in an all mechanical system where the sensor is mounted outside of the inflator housing, shown in an unarmed or safe position prior to assembly with an inflator.

The all-mechanical system as depicted in FIGS. 3–5 requires that a special inflator be designed to accommodate the sensor within its housing. There has already been a substantial investment in tooling and production facilities for electrically actuated inflators by several inflator manufacturers. Also, substantial reliability statistics have been accumulated on these inflator designs through the hundreds of millions of miles that airbag equipped vehicles have traveled. It is desirable to build on this base with new systems that can be done using the sensor designs of this invention as depicted in FIGS. 6 and 7. This sensor design is adapted to be attached to a standard electrical inflator design where a stab primer 691 is used in place of the electrically actuated squib normally used.

The sensor-initiator is shown generally as 600 in FIG. 6. In a similar manner as described above, sensing mass 641 rotates in sensor housing 630 during a crash against the force provided by a cantilevered biasing spring 662 until a D-shaft 658 has rotated sufficiently to release a firing pin 636. Once released, firing pin 636 is propelled by firing pin spring 635 and impacts primer 691 to initiate deployment of the airbag. A washer containing an orifice 692 is provided in the top of primer 691 to minimize the leakage of inflator gases from the inflator 690 while the propellant is burning (FIG. 7). In this manner, the sensor does not have to be constructed of strong materials as discussed in the above referenced patent.

In one configuration of a self-contained system, the sensor assembly and the airbag and inflator assembly are kept separate until mounted onto the vehicle. In this case, the sensor is mounted using an appropriate apparatus (not shown) to the steering wheel after the wheel is mounted to the vehicle. Then, the airbag module is assembled to the steering wheel. In this case, the sensor is armed after it has been installed onto the vehicle through the use of arming screw 670. The inflator is only brought into contact with the sensor after the sensor has been mounted onto the vehicle, thus minimizing the chance of an inadvertent actuation prior to installation. To arm the sensor, arming screw 670 is rotated after the sensor is mounted onto the steering wheel causing it to move downward in its housing 674. This removes the retaining cylinder 673 from blocking the motion of locking ball 675 that removes a lock on the firing pin. As long as ball 675 remains locking the firing pin 636, rotation of the mass 641 will not release the firing pin and the sensor is unarmed. Additional apparatus, not shown, can be used to prevent the assembly and disassembly of the sensor from the steering wheel unless the arming screw 670 is in the unarmed position. Also, interference between the head 680 of the arming screw 670 and the surface 693 of the inflator 690 prevents assembly of the inflator and airbag module to the steering wheel until the sensor has been armed. Thus, in this very simple manner, an inexpensive all-mechanical airbag system can be made using standard inflator designs with minor modifications.

In FIGS. 1 and 2, the stab primer was shown as part of the inflator assembly, i.e., contained within the housing of the inflator assembly defined by housing portions 121,129. On the other hand, in FIG. 8 a cross section view of a through bulkhead initiation system adapted to a mechanical self-contained airbag system is illustrated. In this case, the stab primer 822 is instead part of a sensor assembly 840, i.e., arranged in the sensor housing on the bottom cover thereof if present, and when the stab primer 822 is initiated by a firing pin 842 formed in conjunction with a cantilevered, biasing spring (as in the embodiment shown in FIGS. 1 and 2), it creates a shock on one side of an inflator housing wall 821 which is transmitted through the wall and interacts with a shock sensitive pyrotechnic mix 829 which has been placed into a cavity 805 in the igniter mix. Inflator housing wall 821 is alongside the bottom cover of the sensor housing, but in the alternative the inflator housing wall may be the same as the bottom cover of the sensor housing. This through-bulkhead initiation system and the particular pyrotechnic mix formulation is well known to ordinance engineers where it has been applied to military devices. Such a system has not been used, however, in airbag systems. In this manner, a hole is not opened between the sensor assembly and the inflator assembly and the gas is prevented from leaking into the sensor assembly.

Figure 10:
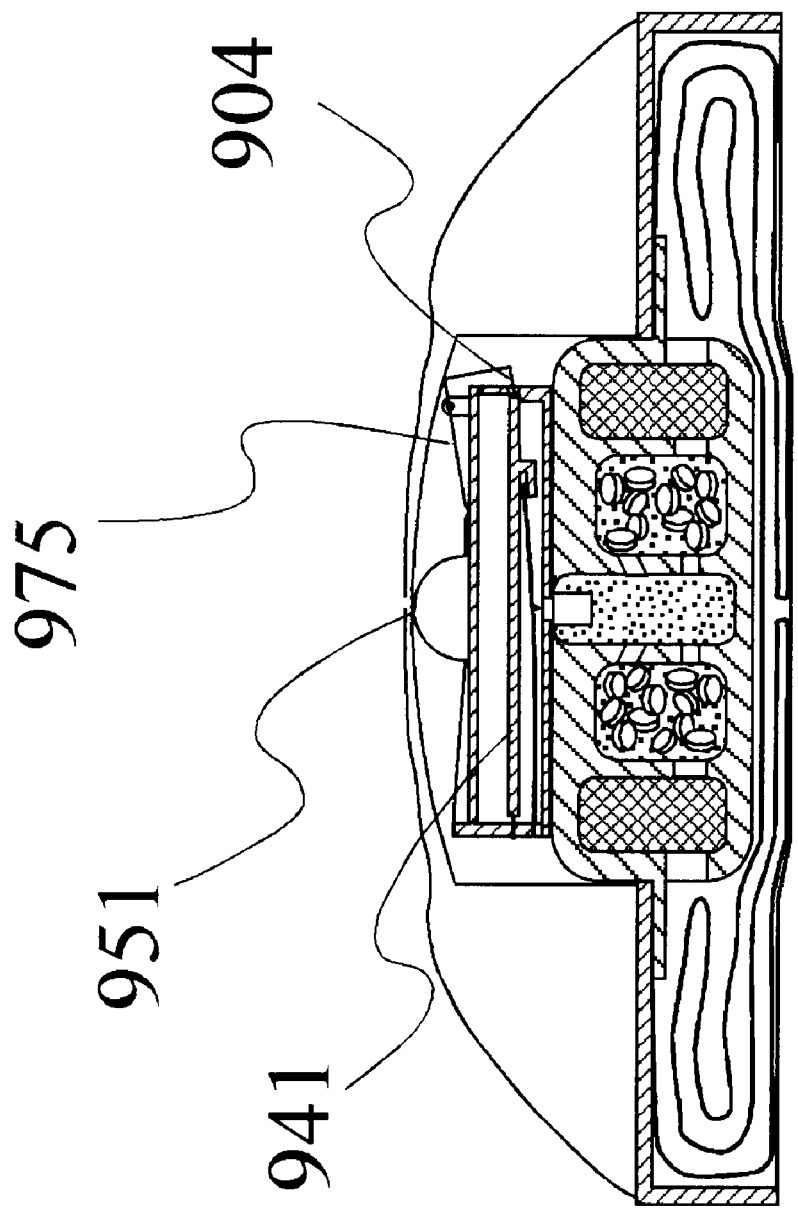
FIG. 10 is a cross section view of the apparatus of FIG. 9 taken along line 10—10 showing the crush sensing arming system after it has been activated by vehicle crush but before the sensing mass of the discriminating sensor has begun to move.
Figure 10A:
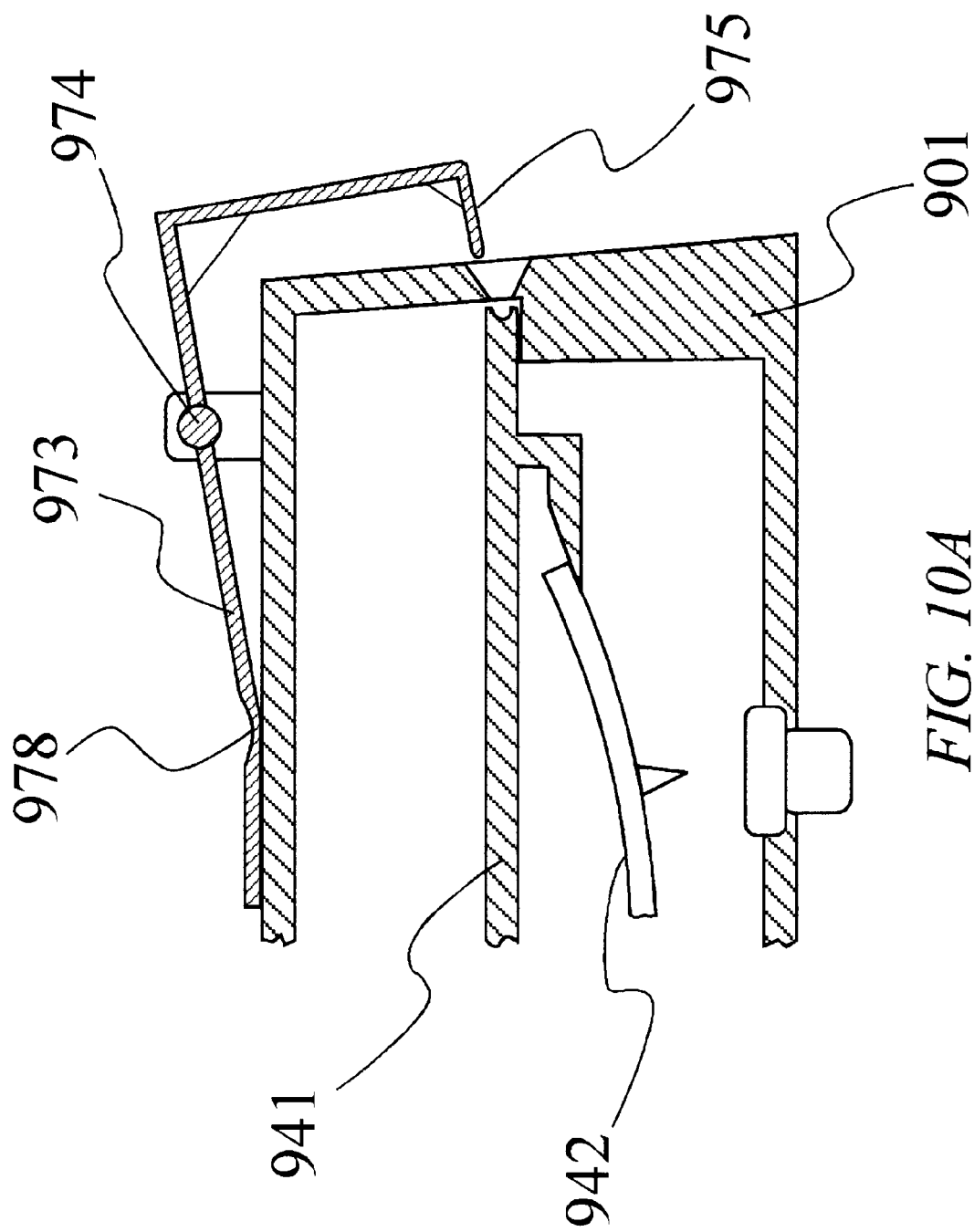
FIG. 10A is a blowup with certain parts removed showing a portion of the sensor shown in FIG. 10 in the armed position.
Figure 11:
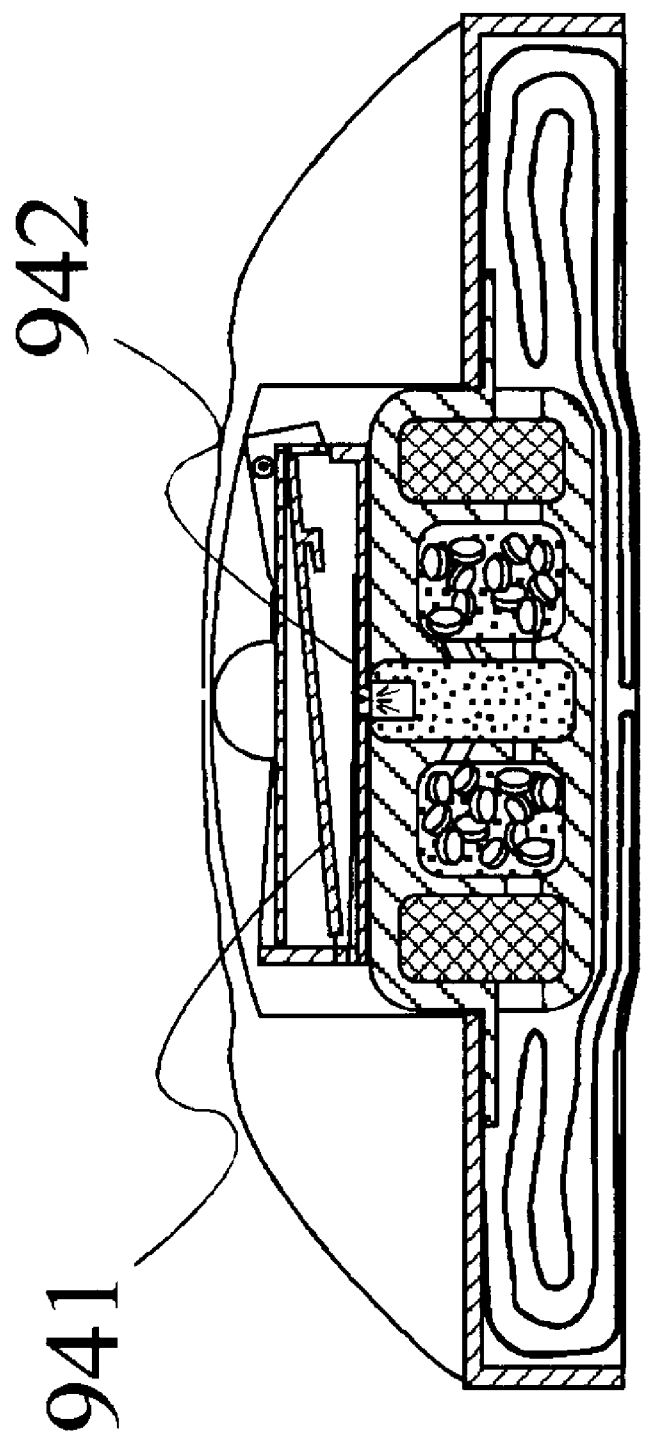
FIG. 11 is a cross section view of the apparatus of FIG. 9, also taken along line 10—10, showing the crush sensing arming system after it has been activated by vehicle crush and showing the sensing mass of the discriminating sensor after it has moved and released the firing pin, triggering the inflation of the airbag.
Figure 11A:
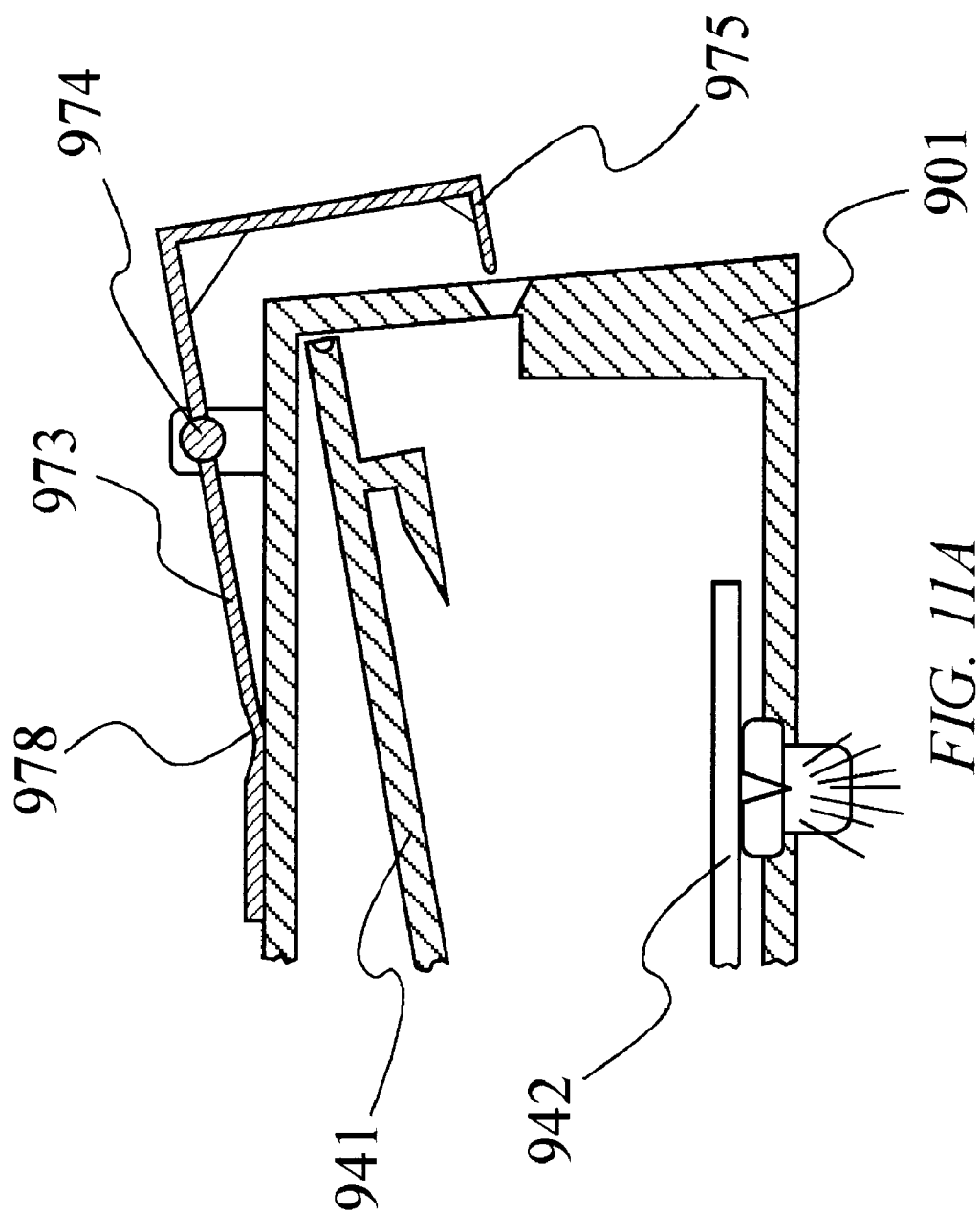
FIG. 11A is a blowup with certain parts removed showing portion of the sensor shown in FIG. 11 in the fired position.

In FIG. 9, a perspective view of a mechanical self-contained airbag system using a crush sensing arming system designated generally as 950 is shown in the state before a crash occurs. In this embodiment, the sensor is armed when the vehicle door skin, or side skin, is crushed to where it impacts a curved impact plate, not shown, which then impacts a sensor can 970 surrounding the sensor assembly and displaces an outer cover 951 thereof relative to a sensor housing 901. Sensor can 970 has a tubular wall arranged partially alongside a housing section of the inflator assembly to thereby define a closed space between the outer cover 951 and an outer surface of the inflator assembly in which the sensor assembly is positioned. The sensor crush-sensing outer cover 951 has a slight arcuate shape so that it oil-cans downward pressing on lever 971 through a semi-spherical pusher member 979. Lever 971 is hingedly mounted at one end thereof to enable it to rotate about its attachment point 972 to the sensor housing 901 and causes lever 973 to also rotate about its pivot point 974 on the sensor housing 901 by virtue of hinge 978. An end 975 of lever 973 extends through an aperture 904 in a wall of the sensor housing 901 and serves to restrain the sensing mass 941 from any movement (FIG. 10). The rotation of lever 973 causes the end 975 of lever 973 to pull out of the sensor housing 901 where it was detenting the sensing mass 941 and preventing the sensing mass 941 from rotating to the degree necessary to release a firing pin spring 942. The sensing mass 941 is then free to move and release the firing pin spring 942 causing the firing pin spring 942 to ignite the stab primer in the inflator assembly, either by contact therewith or by pressure against the inflator assembly housing (see above) causing inflation of the airbag (FIG. 11A). Thus, until the sensor experiences a crushing force from the crash, the airbag system cannot deploy. The sensing mass 941, firing pin spring 942, inflator assembly and airbag may have the same structure as described above with reference to FIGS. 1 and 2. Other features of any of the disclosed embodiments not inconsistent with the embodiments shown in FIGS. 9–11 may also be incorporated therein.

Levers 971 and 973 are joined together by hinge 978 and can be made from a single piece of material. In this case, the hinge would be formed either by a coining or stamping operation or by a milling operation. Naturally, the two levers need not be joined together.

This provides a sensor system that requires the occurrence of two environments that are always present in a crash, crush and velocity change. The crush sensing outer cover 951 is designed to respond and arm the sensor when impacted from any reasonable direction by an impact plate (not shown) which is likely to occur in a crash. For many vehicles, the crush may not reach the sensor at the time that deployment is required. In the case where two systems are used on each side of the vehicle, for example, and an impact occurs at the A-pillar, the rear seat system may not experience crush in time. The arming system shown in FIG. 9 could still be used where the arming would occur when the system is mounted onto the vehicle instead of when the crash occurs. In this case, the curved impact plate would not be necessary and the deflection of the sensor cover would occur either during the mounting process or by a separate operation after the system is mounted.

FIG. 10 is a cross section view of the apparatus of FIG. 9 taken along lines 10—10 showing the crush sensing outer cover 951 and lever system after end 975 has moved out of aperture 904 as a result of crush of the vehicle but before the sensing mass 941 of the discriminating sensor has begun to move. FIG. 11 is a similar view of the apparatus of FIG. 10 but shows the sensing mass 941 of the discriminating sensor after it has moved and released firing pin 942, triggering the inflation of the airbag.

The motion of the sensing mass 941 is damped by the requirement that air must flow between the sensing mass and the housing in the manner described in more detail in the '253 patent referenced above. Naturally, other damping methods such as magnetic damping could also be used.

In the case of FIG. 9, the sensor is entirely surrounded by a metal can 970 that is formed by a drawing process. The sensor can 970 is attached to the inflator assembly, more particularly, the sensor can 970 is attached to one or more housing sections thereof, thereof. The attachment of the sensor can 970 to the inflator assembly or housing section(s) thereof is achieved using structural adhesive 990 such as a urethane or epoxy compound. In this manner, the sensor is hermetically sealed.

The term hermetic seal as used herein means a seal which will not permit the passage of any significant amount of moisture or other contaminants into the interior of the self-contained airbag module and further will not permit the passage of gas into or out of the sensor housing of sufficient quantity as to change the gas density by more than about 5% at any time over the life of the vehicle. Each vehicle manufacturer has an accelerated life test that can be used along with appropriate sensor testing equipment to test the sensor seals according to this definition. Typical O-ring seals are not hermetic by this definition however properly designed plastic and metal welded seals and epoxy and urethane seals are hermetic.

Figure 12:
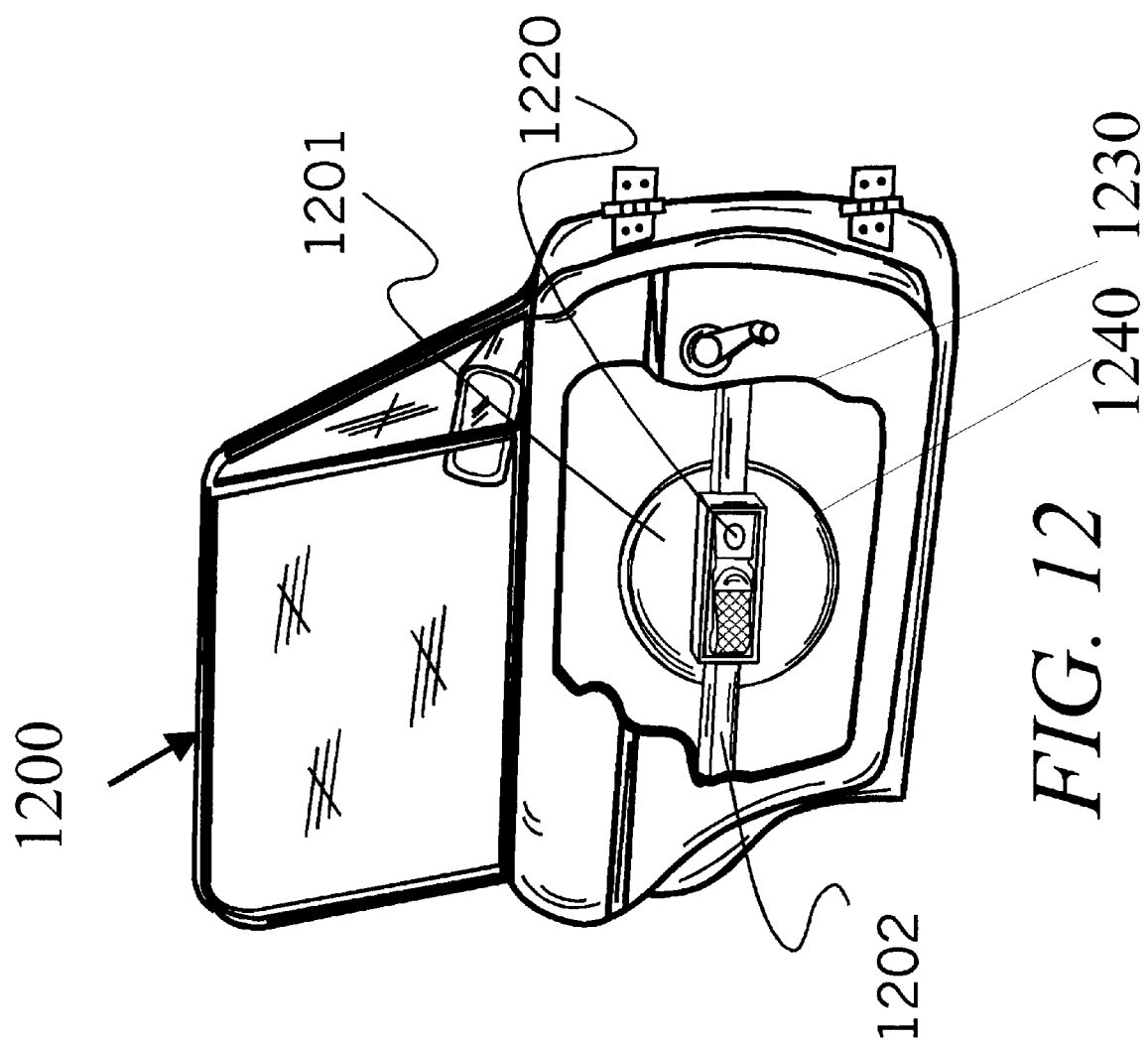
FIG. 12 is a perspective view of a side impact airbag system illustrating the placement of the airbag vents in the door panel and the exhausting of the inflator gases into the vehicle door and also showing the use of a pusher plate to adjust for the mismatch between the point of impact of an intruding vehicle and the sensor of a self contained side impact airbag system.

FIG. 12 is a perspective view of a side impact airbag system illustrating the placement of the airbag vents in the door panel and the exhausting of the inflator gases into the vehicle door 1200 and also showing the use of a pusher plate 1201 to adjust for the mismatch between the point of impact of an intruding vehicle and the sensor of a self contained side impact airbag system 1220. The pusher plate 1201 is shown attached to the main structural door beam 1202 in this illustration but other mounting systems are also possible. The airbag system 1220 is shown between the inner panel 1230 and the outer panel 1240 of the door 1200 The pusher plate 1201 is dimensioned and installed in the door so that during a side impact to any portion of the side of the vehicle which is likely to cause intrusion into the passenger compartment and contact an occupant, the pusher plate will remain in a substantially undistorted form until it has impacted with the sensor causing the sensor to begin deployment of the airbag. In this implementation, a non-sodium azide propellant, such as nitro-cellulose, is used and the gas is exhausted into the door though a pair of orifices 1220. The airbag system 1220 may be any of those disclosed herein.

Figure 13:
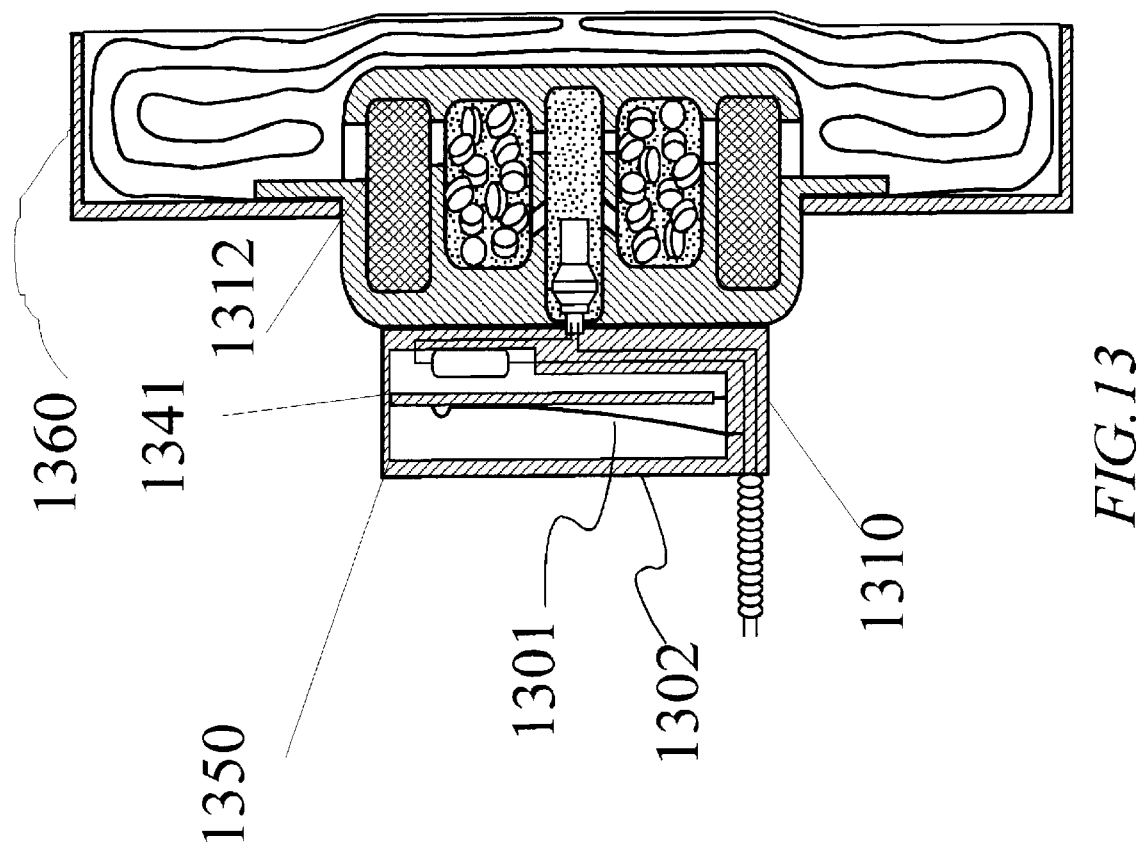
FIG. 13 is a cross section view of a self contained side impact airbag system using an electro-mechanical sensor.

FIG. 13 is a cross section view of a self-contained side impact airbag system using an electromechanical sensor. An electromechanical sensor is one in which the sensing is accomplished through the motion of a sensing mass from a first at-rest position to a second activating position at which point an event happens which typically involves the closing of a switch by mechanical or magnetic means. In the embodiment shown in FIG. 13, biasing spring contact 1301 is caused to engage contact 1302 arranged on top cover 1350 when the sensor experiences a crash as described above, i.e., acceleration of the sensor housing 1310 above a predetermined threshold value which results in movement of the sensing mass until the biasing contact 1301 contacts the other contact 1302. Specifically, the biasing spring contact 1301 is positioned in a position (e.g., bearing against sensing mass 1341 in sensor housing 1310) so that it is moved during a crash along with movement of the sensing mass 1341 (in the upward direction in FIG. 13) to thereby bring the biasing spring contact 1301 into contact with contact 1302. An electrical circuit is thereby completed causing ignition of the primer or squib and thereafter the igniter mix and propellant. As shown in FIG. 13, the structure of the sensor housing 1310, inflator assembly 1312, mounting plate 1360 and sensing mass 1341 may be as described above in appropriate part.

Figure 14:
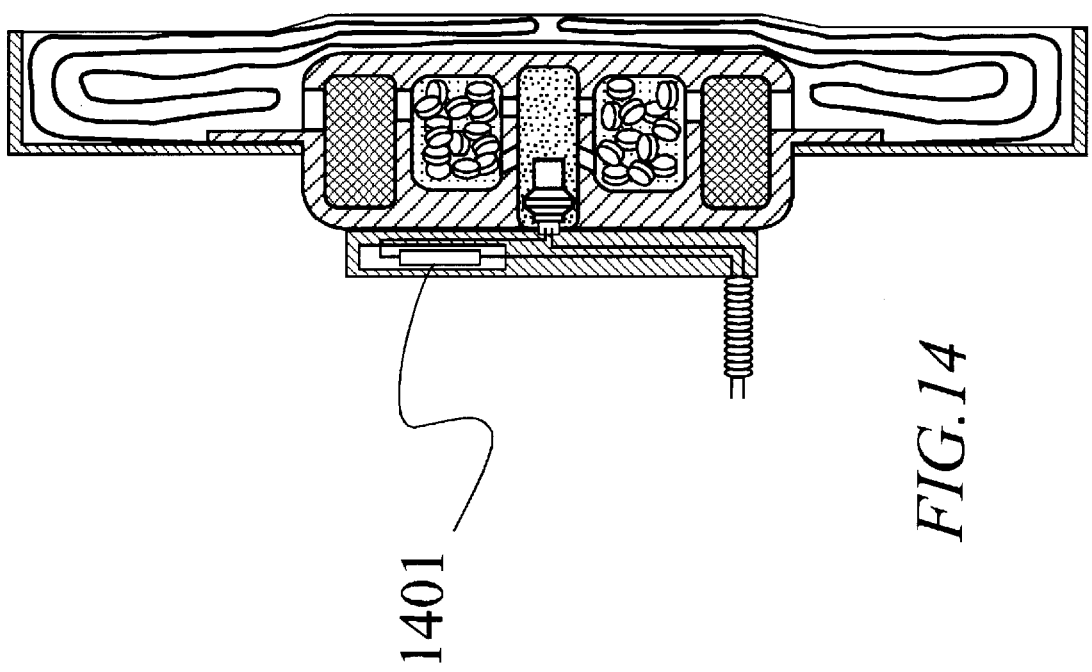
FIG. 14 is a cross section view of a self contained side impact airbag system using an electronic sensor.

FIG. 14 is a cross section view of a self-contained side impact airbag system using an electronic sensor that generates a signal representative of the movement of a sensing mass. Unless otherwise stated or inconsistent with the following description of an airbag system with an electronic sensor, the airbag system with an electronic sensor may include the features of the airbag system described above and below. An electronic sensor is one in which the motion of the sensing mass is typically continuously monitored with the signal electronically amplified with the output fed into an electronic circuit which is usually a micro-processor. Electronic sensors typically use accelerometers that usually make use of strain gage or piezo-electric elements shown here as 1401. The piezo-electric element generates a signal representative of the movement of the sensing mass. Modern accelerometers are sometimes micro-machined and combined with other elements on an electronic chip. In electromechanical sensors, the motion of the sensing mass is typically measured in millimeters and is much larger than the motion of the sensing mass in electronic sensors where the motion is frequently measured in microns or portions of a microns. The signal representative of the motion of the sensing mass is recorded over time and an algorithm in the micro-processor may be designed to determine whether the movement over time of the sensing mass results in a calculated value which is in excess of the threshold value based on the signal. The sensing mass may constitute part of the accelerometer, e.g., the sensing mass is a micromachined acceleration sensing mass. In this case, the micro-processor determines whether the movement of the sensing mass over time results in an algorithmic determined value that is in excess of the threshold value based on the signal.

In embodiments using an electronic sensor, the inflator may include a primer which is part of an electronic circuit including the accelerometer such that upon movement over time of the sensing mass results in a calculated value in excess of the threshold value, the electronic circuit is completed thereby causing ignition of the primer.

When the term electrical as used herein it is meant to include both electromechanical and electronic systems.

Figure 15:
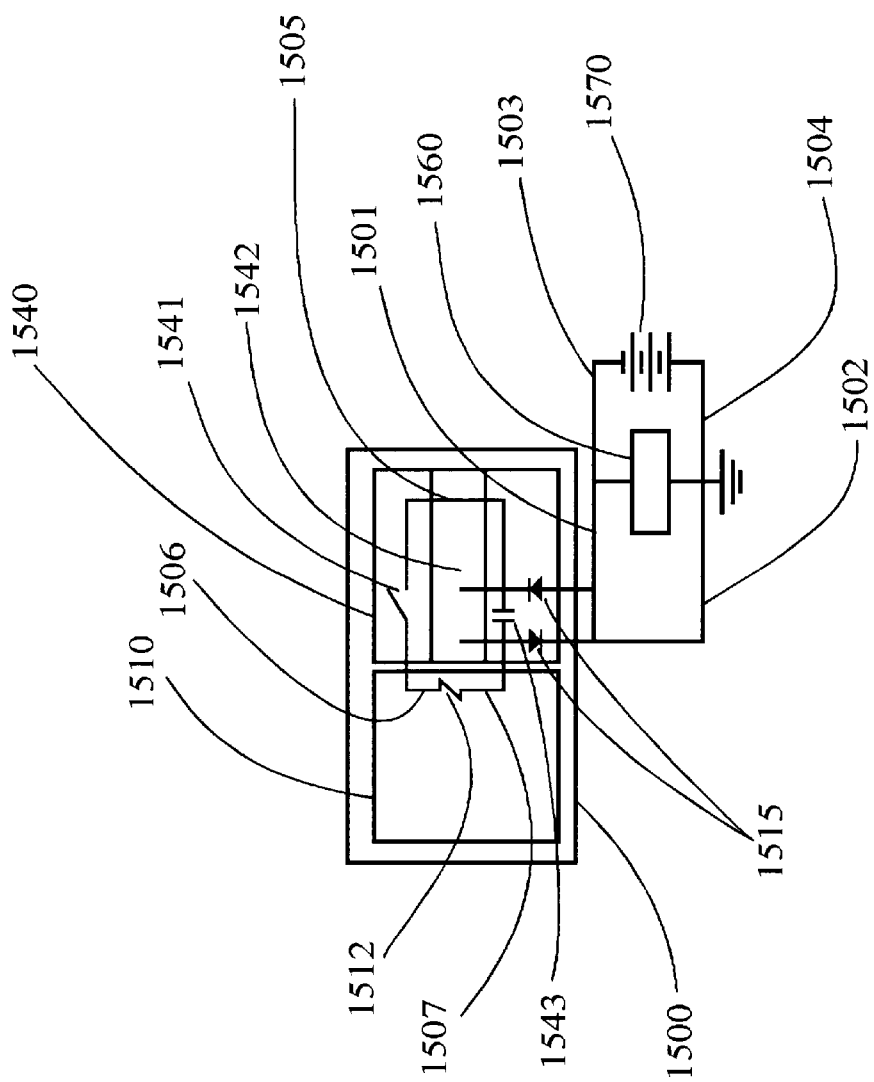
FIG. 15 is a schematic of the electric circuit of an electromechanical or electronic self contained side impact airbag system.

FIG. 15 is a schematic of the electric circuit of an electromechanical or electronic self-contained side impact airbag system. The self-contained module shown generally at 1500 contains a sensor assembly 1540 and an airbag and inflator assembly 1510. The sensor assembly 1540 contains a sensor 1541, a diagnostic module 1542, an energy storage capacitor 1543, and a pair of diodes 1515 to prevent accidental discharge of the capacitor if a wire becomes shorted. The module is electrically connected to a diagnostic monitoring circuit 1560 by wire 1501 and to the vehicle battery by wire 1503. It is also connected to the vehicle ground by wire 1502. The sensor, diagnostic and capacitor power supplies are connected to the squib by wires 1505 through 1507.

In a basic configuration, the diagnostic monitoring circuit 1560 checks that there is sufficient voltage on the capacitor to initiate the inflator in the event of an accident, for example, and either of wires 1501, 1502, 1503 or 1504 are severed. In this case, the diagnostic internal to the self-contained module would not be necessary. In more sophisticated cases, the diagnostic module 1542 could check that the squib resistance was within tolerance, that the sensor calibration was correct (through self testing) and that the arming sensor has not inadvertently closed. It could also be used to record that the arming sensor, discriminating sensor and airbag deployment all occurred in the proper sequence and record this and other information for future investigative purposes. In the event of a malfunction, the diagnostic unit could send a signal to the monitoring circuitry that may be no more than an indication that the capacitor was not at full charge.

A substantial improvement in the reliability of the system is achieved by placing the diagnostic module and backup power supply within the self contained airbag system particularly in the case of side impacts where the impact can take place at any location over a wide area. An impact into a narrow pole at the hinge pillar, for example, might be sufficient to sever the wire from the airbag module to the vehicle power source before the sensor has detected the accident.

Most of the advantages of placing the sensor, diagnostic and backup power supply within the self contained module can of course be obtained if one or more of these components are placed in a second module in close proximity to the self contained module. For the purposes of electromechanical or electronic self contained modules, therefore, as used herein, the terms "self contained module" or "self contained airbag system" will include those cases where one or more of the components including the sensor, diagnostic and backup power supply are separate from the airbag module but in close proximity to it. For example, in the case of steering wheel mounted systems, the sensor and backup power supply would be mounted on the steering wheel and in the case of side impact door mounted systems, they would be mounted within the door. In conventional electrical or electronic systems, on the other hand, the sensor, diagnostic module and backup power supply are mounted remote from the airbag module in a convenient location typically centrally in the passenger compartment such as on the tunnel, under the seat or in the instrument panel.

With the placement of the backup power supply in the self contained module, greater wiring freedom is permitted. For example, in some cases for steering wheel mounted systems, the power can be obtained through the standard horn slip ring system eliminating the requirement of the ribbon coil now used on all conventional driver airbag systems. For side impact installations, the power to charge the backup power supply could come from any convenient source such as the power window or door lock circuits. The very low resistance and thus high quality circuits and connectors now used in airbag systems are not required since even an intermittent or high resistance power source would be sufficient to charge the capacitor and the existence of the charge is diagnosed as described above.

Herein, the terms capacitor, power supply and backup power supply have been used interchangeably. Also, other energy storage devices such as a rechargeable battery could be used instead of a capacitor. For the purposes of this disclosure and the appended claims, therefore, the word capacitor will be used to mean any device capable of storing electrical energy for the purposes of supplying energy to initiate an inflator. Initiation of an inflator will mean any process by which the filling of an airbag with gas is started. The inflator may be either pure pyrotechnic, stored gas or hybrid or any other device which provides gas to inflate an airbag.

Figure 16:
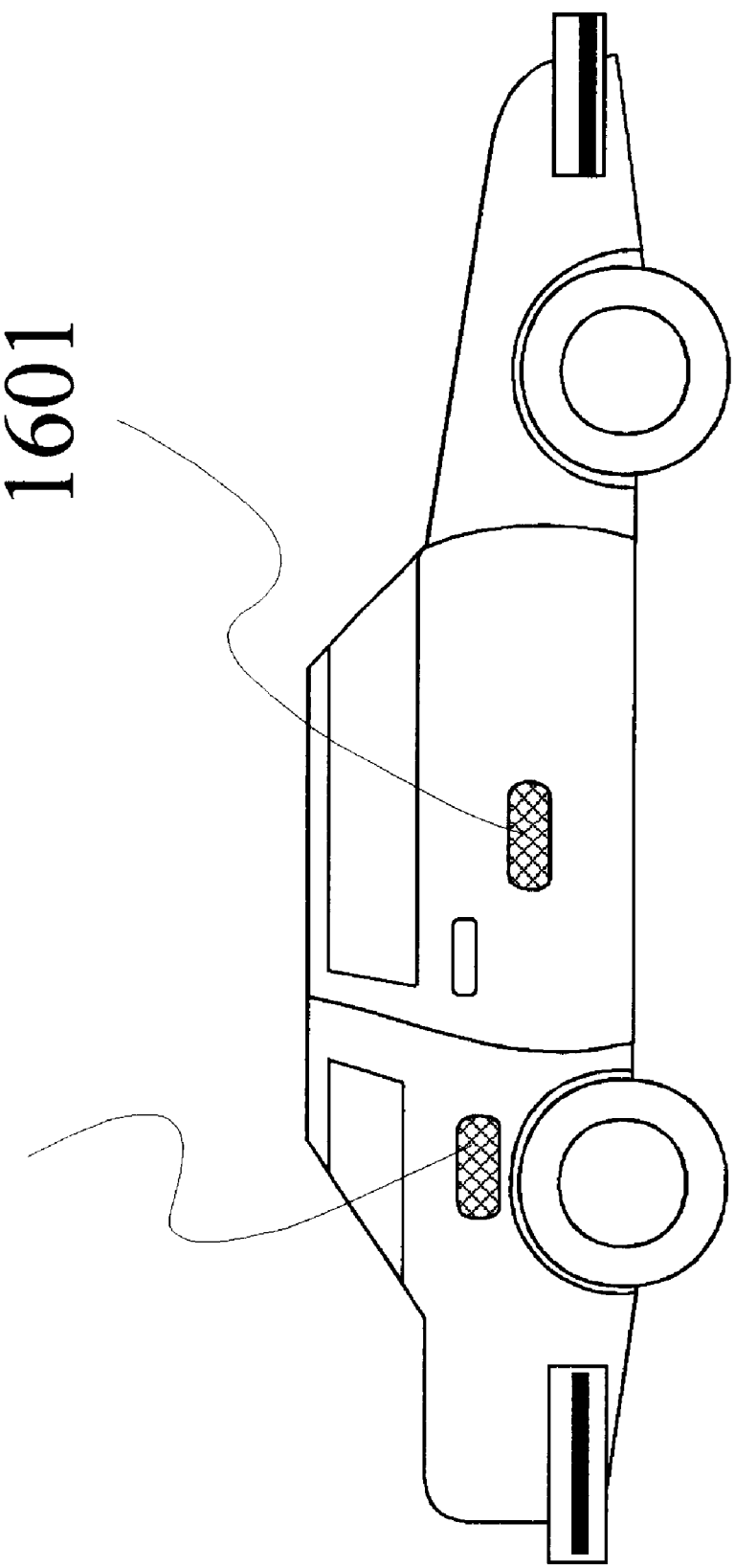
FIG. 16 is a side view of a vehicle showing the preferred mounting of two self contained airbag modules into the side of a coupe vehicle, one inside of the door for the driver and the other between the inner and outer side panels for the rear seat passenger.

FIG. 16 is a side view showing the preferred mounting of two self contained airbag modules 1601 and 1602 on the side on a two door vehicle. Module 1601 is mounted inside of a door, whereby the sensor housing 101 of module 1601 is most proximate the exterior of the vehicle, while module 1602 is mounted between the inner and outer side panels at a location other than the door, in this case, to protect a rear seated occupant. Each of the modules has its own sensor and, in the case of electrical self-contained systems, its own capacitor power supply and diagnostic circuit. Any of the airbag systems disclosed herein may be mounted either inside a door or between inner and outer side panels of the vehicle at a location other than the door. In view of the mounting of module 1602 between inner and outer panels of the vehicle at a location other than the door, the inner and outer panels are thus fixed relative to the vehicle frame and the module 1602 is also thus fixed relative to the frame. By contrast, the module 1601 mounted inside the door is moved whenever the door is opened or closed.

Although several preferred embodiments are illustrated and described above, there are possible combinations using other geometries, materials and different dimensions for the components that can perform the same function. For example, the biasing spring need not be the same as the biasing spring in the case of the implementation shown in FIG. 1 and a magnet might be used in place of a biasing spring for several of the mechanical cases illustrated. Therefore, this invention is not limited to the above embodiments and should be determined by the following claims.

What is claimed is:

1. A vehicle including a side impact airbag system front wheels, rear wheels and a frame defining a front of the vehicle, a rear of the vehicle and first and second sides of the vehicle, said airbag system comprising:
a system housing arranged on the first side of the vehicle alongside at least a portion of a passenger compartment of the vehicle, said system housing defining an interior space,
at least one inflatable airbag arranged in said interior space of said system housing such that when inflating, said at least one airbag is expelled from said system housing into the passenger compartment,
inflator means arranged at least partially within said interior space of said system housing for inflating said at least one airbag, said inflator means comprising an inflator housing containing propellant, and
a crash sensor for initiating inflation of said at least one airbag via said inflator means upon a determination of a crash requiring inflation of said at least one airbag,
said crash sensor comprising
a sensor housing arranged within said system housing, and
a sensing mass arranged in said sensor housing to move relative to said sensor housing in response to accelerations of said sensor housing resulting from the crash into the first side of the vehicle such that upon movement of said sensing mass in excess of a threshold value, said crash sensor initiates said inflator means to inflate said at least one airbag.

2. The vehicle of claim 1, wherein said crash sensor is an electronic sensor and the movement of said sensing mass is monitored.

3. The vehicle of claim 2, wherein said electronic sensor further comprises generating means coupled to said sensing mass for generating a signal representative of the movement of said sensing mass.

4. The vehicle of claim 3, wherein said signal is monitored and recorded over time.

5. The vehicle of claim 3, wherein said electronic sensor further comprises a micro-processor and an algorithm for determining whether the movement over time of said sensing mass as processed by said algorithm results in a calculated value which is in excess of the threshold value based on said signal.

6. The vehicle of claim 3, wherein said generating means comprise at least one piezoelectric element.

7. The vehicle of claim 1, wherein said crash sensor further comprises an accelerometer, said sensing mass constituting part of said accelerometer.

8. The vehicle of claim 7, wherein said crash sensor further comprises a micro-processor for determining whether the movement of said sensing mass over time results in an algorithmic determined value which is in excess of the threshold value based on said signal.

9. The vehicle of claim 7, wherein said accelerometer includes a piezo-electric element for generating a signal representative of the movement of said sensing mass, said crash sensor further comprising a micro-processor for determining whether the movement of said sensing mass over time results in an algorithmic determined value which is in excess of the threshold value based on said signal.

10. The vehicle of claim 7, wherein said inflator means comprise a primer arranged in said inflator housing, said crash sensor including an electronic circuit including said accelerometer and said primer such that upon movement over time of said sensing mass resulting in a calculated value in excess of the threshold value, the electronic circuit is completed thereby causing ignition of said primer.

11. The vehicle of claim 1, wherein said system housing comprises a mounting plate having a bottom wall and flanged side walls, said bottom wall having an aperture, said inflator housing being arranged in said aperture.

12. The vehicle of claim 1, wherein said sensor housing is mounted directly to said inflator housing.

13. The vehicle of claim 1, wherein the first side of the vehicle has a door and said system housing is arranged inside said door.

14. The vehicle of claim 1, wherein a portion of the first side of the vehicle has inner and outer panels fixed in position relative to the frame, said system housing being arranged between said inner and outer panels.

15. The vehicle of claim 1, further comprising a capacitor arranged within said system housing to supply power to initiate deployment of said airbag system.

16. The vehicle of claim 1, further comprising an electronic diagnostic system arranged within said system housing to permit diagnoses of a fault within said airbag system.

17. The vehicle of claim 1, wherein said sensor housing is exterior of said inflator housing.

18. An airbag safety restraint system for a vehicle comprising:
an inflatable airbag having an interior,
an inflator assembly having an inflator housing, an ignitable gas generating material contained in said inflator housing and at least one passage extending between said gas generating material and said interior of said airbag such that upon ignition of said gas generating material, gas is generated and flows through said at least one passage into said interior of said airbag to inflate said airbag, and an electronic crash sensor for causing ignition of said gas generating material upon a determination of a crash requiring inflation of said airbag, said crash sensor comprising a sensor housing situated exterior of said inflator housing , an accelerometer comprising a sensing mass arranged in said sensor housing to move relative to said sensor housing in response to accelerations of said sensor housing resulting from the crash, said accelerometer including a piezoelectric element for generating a signal representative of the movement of said sensing mass, and a micro-processor comprising an algorithm for determining whether the movement of said sensing mass over time results in a calculated value which is in excess of a threshold value based on the signal such that if the movement over time of said sen sing mass results in a calculated value which is in excess of the threshold value, said micro-processor causes ignition of gas generating material and thus inflation of said airbag.

19. The system of claim 18, wherein said sensor housing is mounted proximate to said inflator housing.

20. The system of claim 18, wherein the sensing mass is a micro-machined element.

21. The system of claim 18, wherein said inflator assembly further comprises a primer arranged in said inflator housing for igniting said gas generating material, said crash sensor including an electronic circuit including said accelerometer and said primer such that upon movement of said sensing mass over time resulting in a calculated value in excess of the threshold value, the electronic circuit is completed thereby causing ignition of said primer.

22. An airbag safety restraint system for a vehicle comprising:

an inflatable airbag having an interior, an inflator assembly having an inflator housing, an ignitable gas generating material contained in said inflator housing and at least one passage extending between said gas generating material and said interior of said airbag such that upon ignition of said gas generating material, gas is generated and flows through said at least one passage into said interior of said airbag to inflate said airbag, and an electronic crash sensor for causing ignition of said gas generating material upon a determination of a crash requiring inflation of said airbag, said crash sensor comprising a sensor housing situated exterior of said inflator housing, and an accelerometer arranged in said sensor housing and including a sensing mass movable relative to said sensor housing in response to accelerations of said sensor housing resulting from the crash, said accelerometer being arranged to generate a signal representative of the movement of said sensing mass over time, said crash sensor being arranged to cause ignition of said gas generating material if the movement over time of said sensing mass represented by said signal results in a calculated value which is in excess of a threshold value.

23. The system of claim 22, wherein said sensor housing is mounted proximate to said inflator housing.

24. The system of claim 22, wherein said sensing mass is a micro-machined element.

25. The system of claim 22, wherein said inflator assembly further comprises a primer arranged in said inflator housing for igniting said gas generating material, said crash sensor including an electronic circuit including said accelerometer and said primer such that upon movement over time of said sensing mass results in a calculated value in excess of the threshold value, the electronic circuit is completed thereby causing ignition of said primer.

26. The system of claim 22, wherein said crash sensor further comprises a micro-processor for determining whether the movement over time of said sensing mass results in a calculated value which is in excess of the threshold value based on said signal.

27. A vehicle including a side impact airbag system, front wheels, rear wheels and a frame defining a front of the vehicle, a rear of the vehicle and first and second sides of the vehicle, said airbag system comprising:

a system housing arranged on the first side of the vehicle alongside at least a portion of a passenger compartment of the vehicle, said system housing defining an interior space, at least one inflatable airbag arranged in said interior space of said system housing such that when inflating, said at least one airbag is expelled from said system housing into the passenger compartment, inflator means arranged at least partially within said interior space of said system housing for inflating said at least one airbag, said inflator means comprising an inflator housing containing propellant, and a crash sensor for initiating inflation of said at least one airbag via said inflator means upon a determination of a crash requiring inflation of said at least one airbag, said crash sensor comprising a sensor housing arranged proximate to said inflator housing, and a sensing mass arranged in said sensor housing to move relative to said sensor housing in response to accelerations of said sensor housing resulting from the crash into the first side of the vehicle such that upon movement of said sensing mass in excess of a threshold value, said crash sensor initiates said inflator means to inflate said at least one airbag.

28. The vehicle of claim 27 wherein the threshold value is a maximum motion of said sensing mass required to determine that a crash requiring deployment of said at least one airbag is taking place.

* * * * *

UNITED STATES PATENT AND TRADEMARK OFFICE
CERTIFICATE OF CORRECTION

PATENT NO.      : 6,419,265 B1
DATED           : July 16, 2002
INVENTOR(S)     : David S. Breed et al.

It is certified that error appears in the above-identified patent and that said Letters Patent is hereby corrected as shown below:

Column 20,
Line 1, change "being" to -- including a piezo-electric element --.

Signed and Sealed this

Eighteenth Day of March, 2003

JAMES E. ROGAN
*Director of the United States Patent and Trademark Office*